United States Patent
Hannuksela et al.

(10) Patent No.: US 9,679,257 B2
(45) Date of Patent: Jun. 13, 2017

(54) METHOD AND APPARATUS FOR ADAPTING A CONTEXT MODEL AT LEAST PARTIALLY BASED UPON A CONTEXT-RELATED SEARCH CRITERION

(75) Inventors: Miska Hannuksela, Ruutana (FI); Antti Eronen, Tampere (FI); Jussi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 790 days.

(21) Appl. No.: 13/807,726

(22) PCT Filed: Jul. 1, 2010

(86) PCT No.: PCT/FI2010/050569
§ 371 (c)(1),
(2), (4) Date: May 15, 2013

(87) PCT Pub. No.: WO2012/001216
PCT Pub. Date: Jan. 5, 2012

(65) Prior Publication Data
US 2013/0226850 A1    Aug. 29, 2013

(51) Int. Cl.
*G06N 99/00* (2010.01)
*G10L 25/48* (2013.01)
*G06F 17/30* (2006.01)

(52) U.S. Cl.
CPC ..... *G06N 99/005* (2013.01); *G06F 17/30265* (2013.01); *G10L 25/48* (2013.01)

(58) Field of Classification Search
CPC .............................. G06N 99/005; G06F 3/017
See application file for complete search history.

(56) References Cited

U.S. PATENT DOCUMENTS

2007/0234213 A1* 10/2007 Krikorian ........ H04N 21/23406
                                                    715/716
2008/0071749 A1    3/2008 Schloter
2008/0195657 A1    8/2008 Naaman et al.
(Continued)

FOREIGN PATENT DOCUMENTS

WO    WO-2008/097706 A1    8/2008

OTHER PUBLICATIONS

Office Action for Chinese Application No. 201080068322.X dated May 5, 2015.
(Continued)

*Primary Examiner* — Michael B. Holmes
*Assistant Examiner* — Ola Olude Afolabi
(74) *Attorney, Agent, or Firm* — Alston & Bird LLP

(57) ABSTRACT

A method, devices, computer program products and an internet service is disclosed for adapting a context model. In the method a media clip is received. Also sensor data captured at least partly when the media clip was captured is received. A context is derived using a context model based at least partly on the sensor data and an indication on the context is provided to a user by receiving a search query having at least one context-related search criterion, deriving a similarity between the context and the at least one context-related search criterion and causing at least a part of the media clip to be presented as a response to the search query. Feedback on the relevance of the context is received from the user. Based on the feedback, the context model may then be adapted.

18 Claims, 12 Drawing Sheets

(56) References Cited

U.S. PATENT DOCUMENTS

2009/0089288 A1    4/2009  Petersen
2009/0089711 A1    4/2009  Dunton et al.
2010/0146444 A1*   6/2010  Wang .................. G06F 3/0488
                                                            715/815

OTHER PUBLICATIONS

Office Action for Chinese Application No. 201080068322X dated Sep. 28, 2016.
International Search Report for Application No. PCT/FI2010/050569 dated Apr. 11, 2011.
Naaman, M. et al., *Zone Tag's Collaborative Tag Suggestions: What is This Person Doing in My Phone?*, IEEE Multimedia, vol. 15, No. 3, Jul. 1, 2008, pp. 34-40.
Naaman, M. et al., *Leveraging Context to Resolve Identity in Photo Albums*, Proceedings of the 5$^{th}$ ACM/IEEE Joint Conference on Digital Libraries, JCDL'05, vol. 5, Jun. 2005, pp. 178-187.
Patel, S. N., et al.; "*The ContextCam: Automated Point of Capture Video Annotation*;" LNCS, vol. 3205; pp. 301-318; dated 2004.
Extended European Search Report for Application No. 10854009.7; dated May 9, 2014.
International Preliminary Report on Patentability for Application No. PCT/FI2010/050569; dated Jan. 8, 2013.
International Written Opinion for Application No. PCT/FI2010/050569; dated Apr. 11, 2011.
Office Action for corresponding Chinese Application No. 201080068322.X dated Jan. 21, 2016.

* cited by examiner

METHOD AND APPARATUS FOR ADAPTING A CONTEXT MODEL AT LEAST PARTIALLY BASED UPON A CONTEXT-RELATED SEARCH CRITERION

TECHNICAL FIELD

The present invention relates to adapting a context model of a context recognizer. The invention also relates to a context recogniser and a computer program product having stored therein a computer code for adapting a context model of a context recognizer.

BACKGROUND

Portable devices like mobile phones and laptop computers have become very popular among people. At least mobile phones are often carried with when people move around. Contexts in which such portable devices are carried with by users of the portable devices may vary. Sometimes it may be desirable to adapt the properties of the portable devices or application(s) possibly running in the portable devices to the environment the user is located in and to the activities of the user.

Digital cameras have also become a common household object very quickly in the past decade. In addition to standalone cameras, many other electronic devices like mobile phones and computers are being equipped with a digital camera. The pictures and/or videos taken with a digital camera are saved on a memory card or internal memory of the device, and they can be accessed for viewing and printing from that memory easily and instantaneously. Taking a photograph has become easy and very affordable. This has naturally led to an explosion in the number of digital pictures and with a usual size of a few megabytes per picture, to an explosion of the storage needs. To manage the thousands of pictures a person easily has, computer programs and internet services have been developed. Such programs and services typically have features that allow a person to arrange the pictures according to some criteria, or even carry out a search to find the desired images.

Searching for pictures and videos containing desired content is a challenging task. Often, some additional information on the picture or video like the time or the place of capture is available to help in the search. It is also possible to analyze the picture contents e.g. by means of face recognition so that people's names can be used in the search. This naturally requires some user interaction to associate the names to the faces recognized. To help the search, users of the picture and video management systems may give textual input to be attached to the pictures, they may classify and rate pictures and perform other manual tasks to help in identifying desired pictures later when they need to find them. Such manual operations are clumsy and time-consuming, and on the other hand, fully automatic picture search methods may often yield unsatisfactory results.

There is a need to develop methods to sense the environment, such as outdoors, indoors, office, or restaurant, and activity, such as running or walking, so that devices, applications and services that adapt to user's situation can be provided.

In particular, it has been noticed that one problem in making commercially feasible systems that automatically analyze user context may be the ability to model the individual characteristics of each user. This might be possible using an elaborative enrollment phase, during which the user would input a range of environments and activities, the system would collect the data, and update and/or train its models. However, this may be too demanding for end users.

Some Example Embodiments

Now there has been invented an improved method and technical equipment implementing the method, by which user specific adaptation data may be collected unobtrusively without bothering the user too much so that the performance of a context-recognition algorithm may be improved. Various aspects of the invention include a method, an apparatus, a server, a client and a computer readable medium comprising a computer program stored therein. In some embodiments a relevance feedback may be used for adapting a model for another modality than used in the search query or included in the content items. For example, relevance feedback for images may be used to adapt an audio-based context model.

Some example embodiments of the invention comprise a context recognizer (e.g. based on audio) and a camera application. When the user shoots a picture, one or more tags are suggested to the user based on the picture taking context. When the user makes a selection to link a tag to the image, this information is used to adapt the context recognizer. For example, if the context recognizer suggests a tag "street" for the image, and the user selects the tag, the model for the context "street" is adapted. Therefore, the context recognizer algorithm may learn to better model the contexts visited by the user.

Various embodiments of the invention are disclosed in the dependent claims.

Some embodiments of the invention provide adaptation of one or more context models based on which tags the user selects from the suggested ones.

According to a first aspect of the invention, there is provided a method comprising:
  receiving a media clip;
  receiving sensor data captured at least partly in connection with a capture of the media clip;
  deriving at least one context using a context model based at least partly on the sensor data;
  providing an indication on the context to a user by receiving a search query having at least one context-related search criterion, deriving a similarity between the context and the at least one context-related search criterion and causing at least a part of the media clip to be presented as a response to the search query;
  receiving feedback on the relevance of the context from the user;
  adapting the context model based on the feedback.

According to a second aspect of the invention, there is provided an apparatus comprising:
  means for receiving a media clip;
  means for receiving sensor data captured at least partly in connection with a capture of the media clip;
  means for deriving at least one context using a context model based at least partly on the sensor data;
  means for providing an indication on the context to a user;
  means for receiving feedback on the relevance of the context from the user; and
  means for adapting the context model based on the feedback.

According to a third aspect of the invention, there is provided an apparatus comprising:
  at least one processor
  and at least one memory including computer program code the at least one memory and the computer program code configured to, with
the at least one processor, cause the apparatus at least to
receive a media clip;
receive sensor data captured at least partly in connection with a capture of the media clip;
derive at least one context using a context model based at least partly on the sensor data;
providing an indication on the context to a user by receiving a search query having at least one context-related search criterion, deriving a similarity between the context and the at least one context-related search criterion and causing at least a part of the media clip to be presented as a response to the search query;
receive feedback on the relevance of the context from the user;
adapt the context model based on the feedback.

According to a fourth aspect of the invention, there is provided an apparatus comprising:
a first input configured for receiving a media clip;
a second input configured for receiving sensor data captured at least partly in connection with a capture of the media clip;
a first element configured for deriving at least one context using a context model based at least partly on the sensor data;
a second element configured for providing an indication on the context to a user;
a third input configured for receiving feedback on the relevance of the context from the user;
a third element configured for adapting the context model based on the feedback.

According to a fifth aspect of the invention, there is provided a computer program product comprising at least one computer-readable storage medium having computer-executable program code portions stored therein, the computer-executable program code portions comprising program code instructions for:
receiving a media clip;
receiving sensor data captured at least partly in connection with a capture of the media clip;
deriving at least one context using a context model based at least partly on the sensor data;
providing an indication on the context to a user by receiving a search query having at least one context-related search criterion, deriving a similarity between the context and the at least one context-related search criterion and causing at least a part of the media clip to be presented as a response to the search query;
receiving feedback on the relevance of the context from the user;
adapting the context model based on the feedback.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
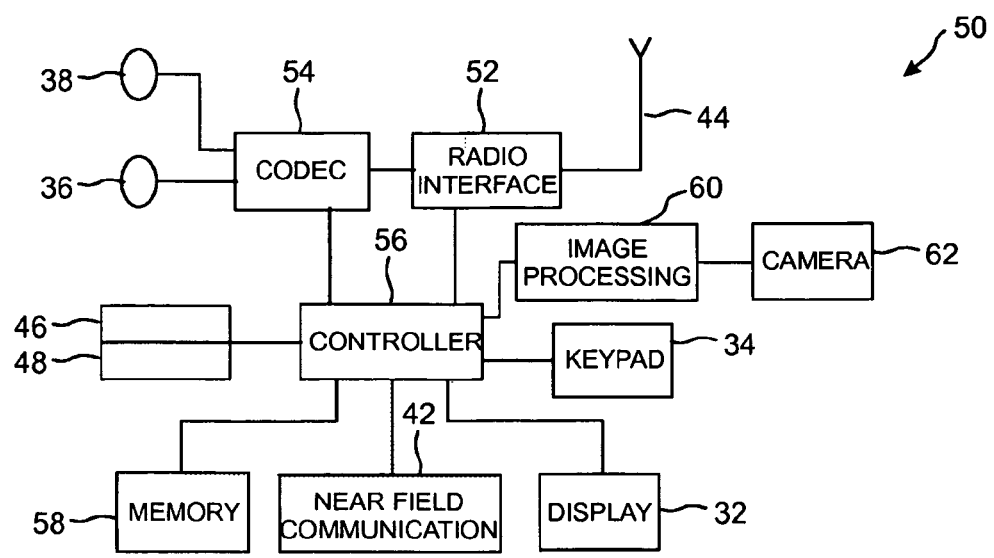
FIG. 1 shows schematically an electronic device employing some embodiments of the invention.
Figure 2:
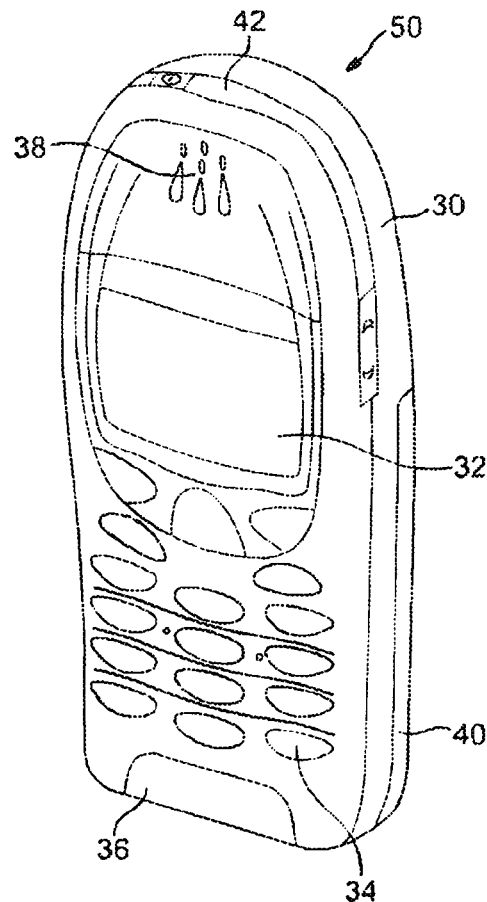
FIG. 2 shows schematically a user equipment suitable for employing some embodiments of the invention.

In the following, several embodiments of the invention will be described in the context of adapting context models by using user activity or device environment relating to tagging media data as an indicator. It is to be noted, however, that the invention is not limited to a specific device or a specific network setup. In fact, the different embodiments have applications widely in any environment where adaptation of context models needs to be improved.

A probabilistic tag is a union of a keyword and at least one parameter value indicating the relevance of the keyword. The keyword may be represented using any character set, such as UTF-16. The keyword may be associated with synonyms and translations to different languages. The keyword may also be associated with or represented by a feature vector indicating its semantics in a certain vocabulary, which may represent a natural language. For example, the keyword may be represented by an index to an ontology representation. The relevance of the keyword may be indicated by a probability or likelihood of the keyword being relevant. Alternatively or in addition, a count on user relevance feedback hits may be indicated.

One idea of the relevance feedback is to let users guide an information retrieval system. During the retrieval process, the user interacts with the system and rates the relevance of the retrieved images, according to his/her subjective judgment. With this additional information, the system dynamically learns the user's intention, and gradually presents better results. Many of the systems offer a keyword-based search interface. The system returns images that match the given keyword-based search query. The user then gives feedback on the relevance of the search results either implicitly (by selecting images to view in a larger scale) or explicitly (by indicating whether or not a particular image matches the query). Concerning the images for which the relevance feedback is given, the retrieval system then may modify the likelihood of the probabilistic tag matching the keywords used in the search.

It is also possible to combine keyword-based and visual-feature-based searching and relevance feedback so that they complement each other in the retrieval processes so as to make retrieval more accurate and efficient. They may use query by example, i.e., visual-feature-based search by example or similarity match. When relevance feedback has been given to search results, it can be used for various purposes. For example, the probability of those probabilistic tags of the relevant search results that match the keywords may be modified. An iterative search may be done by providing new search results. The visual features of in the images indicated to be relevant in the previous search steps may be weighted higher in a new similarity search.

In the above-mentioned uses of relevance feedback, the feedback may be used specifically for a single user or a group of known users or it may be used collectively for all users.

In a multimodal search, with and without relevance feedback, visual, aural, and textural features can be used in a search of video or images. An approach regarding to the multimodal search is to compute the relevance of the search query modality-wise first. For example, example images and videos given in the search query can be matched against visual contents of a video and/or image database by a single search method, while a separate search method handles the query text keywords and matches them against a speech recognition transcript of the videos in the database. Then, a weighted sum can be used to combine these relevancies to a single value.

A query-independent strategy, where the same search mechanism is applied for every incoming query, regardless of the intentions of the user, characteristics of the query itself, and properties of the items being search for, is inadequate and can poorly serve many types of searches.

One approach is to predefine a set of query classes, which are sets of queries in which the optimal search strategies are similar for all queries contained within the class. For example, in broadcast news video, searches for shots of named persons may be best handled by giving more weight to the text search method, while a search for a sports scene may give more weight to an example-based image search method, so these types of queries would require their own classes. Consequently, the weighting between modalities is adapted based on the topic of the query. The query classes and the mapping between a query to a class can be automatically determined. A semantic space can be used to map the query to a class, and the semantic content of the query can be estimated through methods such as counting named entities and parts of speech and measuring lexical relationships between keywords across various queries.

Another approach is to adapt the search algorithm based on the intent or task of the query. For example, a user might want to find an exact piece of data, such as a home page or a particular multimedia item, or a service for performing a particular task, such as "buy plane tickets".

In another approach, the search can be adapted by the context, including the current location of the user, user's history of queries and the resulting documents that he or she has clicked (which can represent the user's identity and interests), and the current document the user is browsing at the time of issuing the search.

Another approach is to modify the weighting between the modalities for each particular content item based on past relevance feedback. In other words, the statistics of the relevance feedback for a particular video clip can be used to modify the weights of different modalities for this clip and/or the weights of particular feature vector for this clip.

In other approaches, the adaptation or learning based on relevance feedback need not be specific to a particular content item, but may be specific to a group of content items or a specific query task/intent.

An alternative approach to fusion based on linear weighted summation of the relevancies of single-modality search results is known as re-ranking. For example, the initial search can be taken from a text search over the speech recognition transcripts. The top-returned documents of the text-based search are considered to be pseudo-positive, and pseudo-negative examples are sampled from elsewhere in the list of the search results. Both pseudo-positive and pseudo-negative samples are clustered according to their visual features. The cluster that has the highest proportion of pseudo-positive samples relative to pseudo-negative samples is re-ranked to appear highest in the final search results.

Relevance feedback has been used to adapt the model(s) used for feature extraction, classification, and/or similarity matching of the content. For example, relevance feedback of text-based queries for images has been used to adapt visual feature models.

Either the search query or the searched items may have included the modality of the model that has been adapted based on the relevance feedback. For example, if images were searched for, the visual feature model may be adapted based on the relevance feedback.

The following describes in further detail suitable apparatuses and possible mechanisms for the provision of enhancing adaptation of context models for content aware devices, applications and/or services. In this regard reference is first made to FIG. 1 which shows a schematic block diagram of an exemplary apparatus or electronic device 50, which may incorporate a context recognizing and adapting module 100 according to an embodiment of the invention.

The electronic device 50 may for example be a mobile terminal or user equipment of a wireless communication system, a digital camera, a laptop computer etc. However, it would be appreciated that embodiments of the invention may be implemented within any electronic device or apparatus which may contain context adaptation properties.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. In some embodiments the display 32 may be a touch-sensitive display meaning that, in addition to be able to display information, the display 32 is also able to sense touches on the display 32 and deliver information regarding the touch, e.g. the location of the touch, the force of the touch etc. to the controller 56. Hence, the touch-sensitive display can also be used as means for inputting information. In an example embodiment the touch-sensitive display 32 may be implemented as a display element and a touch-sensitive element located above the display element.

The apparatus 50 may further comprise a keypad 34. In other embodiments of the invention any suitable data or user interface mechanism may be employed. For example the user interface may be implemented as a virtual keyboard or data entry system as part of a touch-sensitive display or it may contain speech recognition capabilities. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a near field communication (NFC) connection 42 for short range communication to other devices, e.g. for distances from a few centimeters to few meters or to tens of meters. In other embodiments the apparatus 50 may further comprise any suitable short range communication solution such as for example a Bluetooth wireless connection, an infrared port or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to a codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system and/or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 62 capable of recording or detecting individual frames or images which are then passed to an image processing circuitry 60 or controller 56 for processing. In other embodiments of the invention, the apparatus may receive the image data from another device prior to transmission and/or storage. In other embodiments of the invention, the apparatus 50 may receive either wirelessly or by a wired connection the image for coding/decoding.

Figure 3:
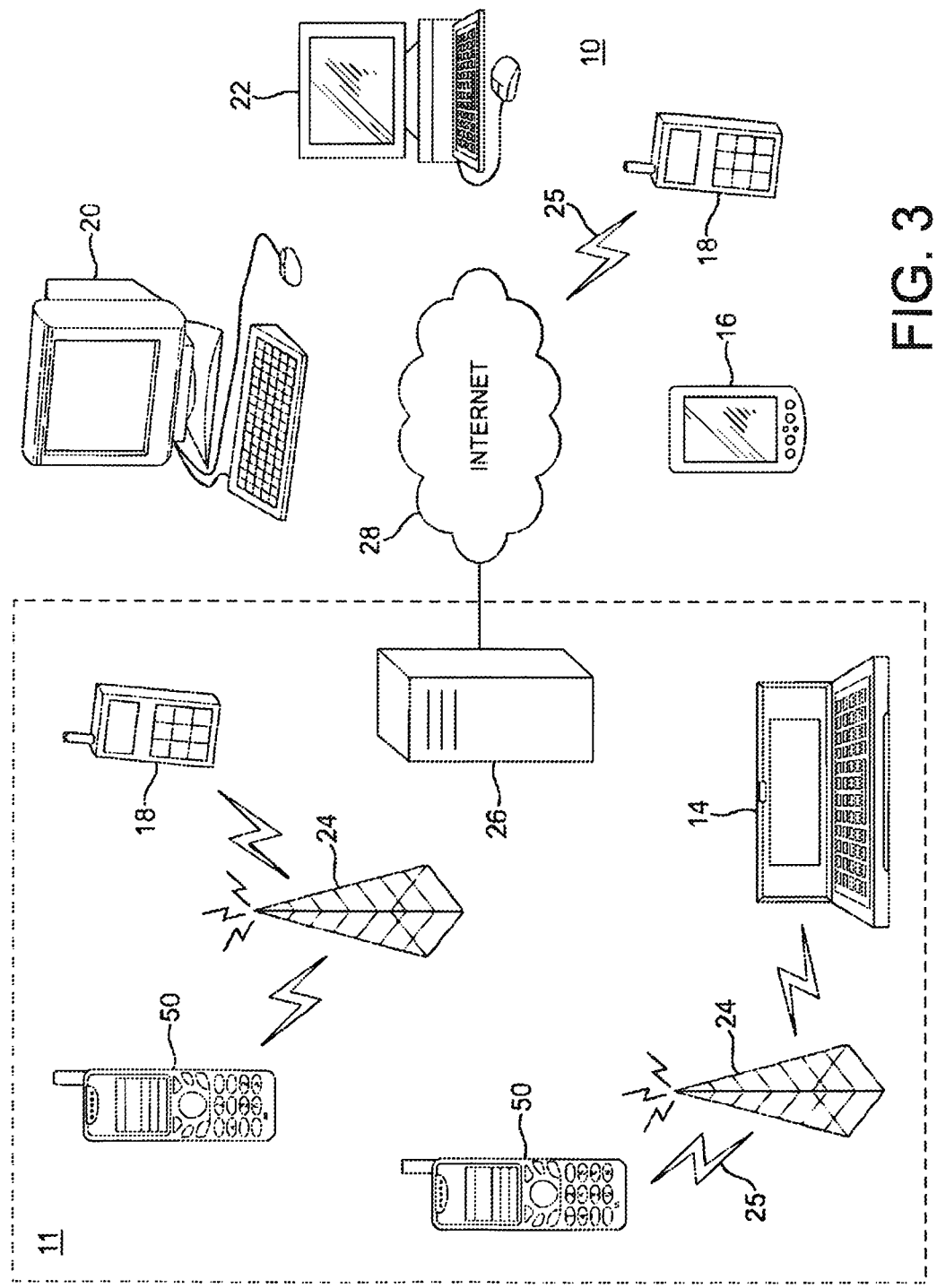
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as the global system for mobile communications (GSM) network, $3^{rd}$ generation (3G) network, $3.5^{th}$ generation (3.5G) network, $4^{th}$ generation (4G) network, universal mobile telecommunications system (UMTS), code division multiple access (CDMA) network etc), a wireless local area network (WLAN) such as defined by any of the Institute of Electrical and Electronic Engineers (IEEE) 802.x standards, a bluetooth personal area network, an ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
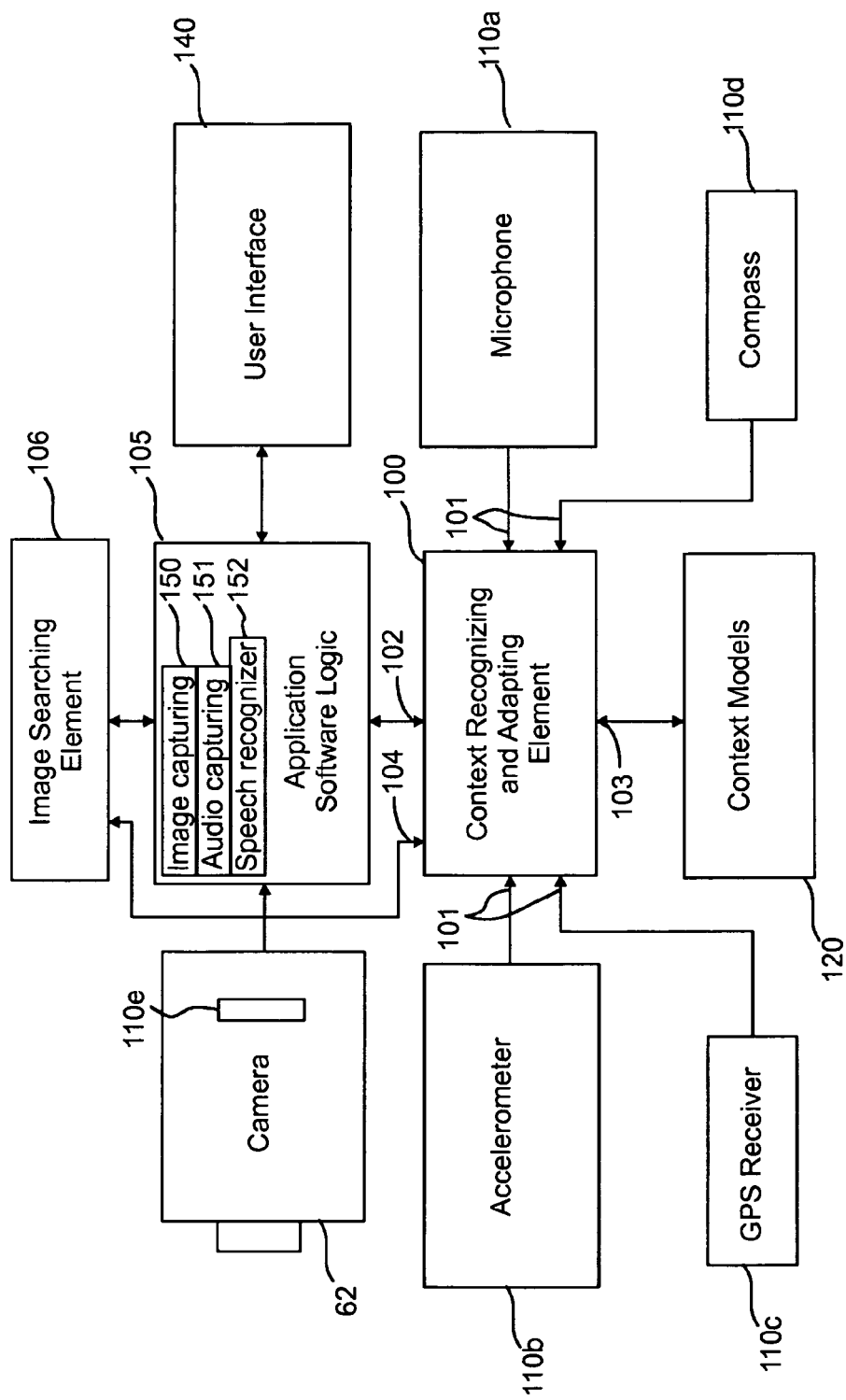
FIG. 4a shows schematically some details of an apparatus employing embodiments of the invention.

In FIG. 4a some further details of an example embodiment of the apparatus 50 are depicted. The context recognizing and adapting module 100 may comprise one or more sensor inputs 101 for inputting sensor data from one or more sensors 110a-110e. The sensor data may be in the form of electrical signals, for example as analog or digital signals. The context recognizing and adapting module 100 also comprises an application interface 102 for communicating with an application, and a context model interface 103 for inputting data regarding context models and for outputting data regarding updated context models. The application interface 102 can be used, for example, to input data regarding a selection of a tag and to output data from the context recognizing and adapting module 100 to an application software logic 105. The context recognizing and adapting module 100 may further comprise a search interface 104 for communicating with an image searching element 106 which can be used for searching images from the memory 58, for example.

The application software logic 105 may comprise an image capturing application 150 which may have been started in the apparatus so that the user can capture images and/or videos. The application software logic 105 may also comprise, as a part of the image capturing application or as a separate audio capturing application 151, an audio recording application 151 to record audio signals captured e.g. by the microphone 36 to the memory 58. As a generalization, the application software logic 105 may comprise one or more media capturing applications 150, 151 so that the user can capture media clips. It is also possible that the application software logic 105 is capable of simultaneously running more than one media capturing applications 150, 151. For example, the audio capturing application 151 may provide audio capturing when the user is taking images.

Figure 4B:
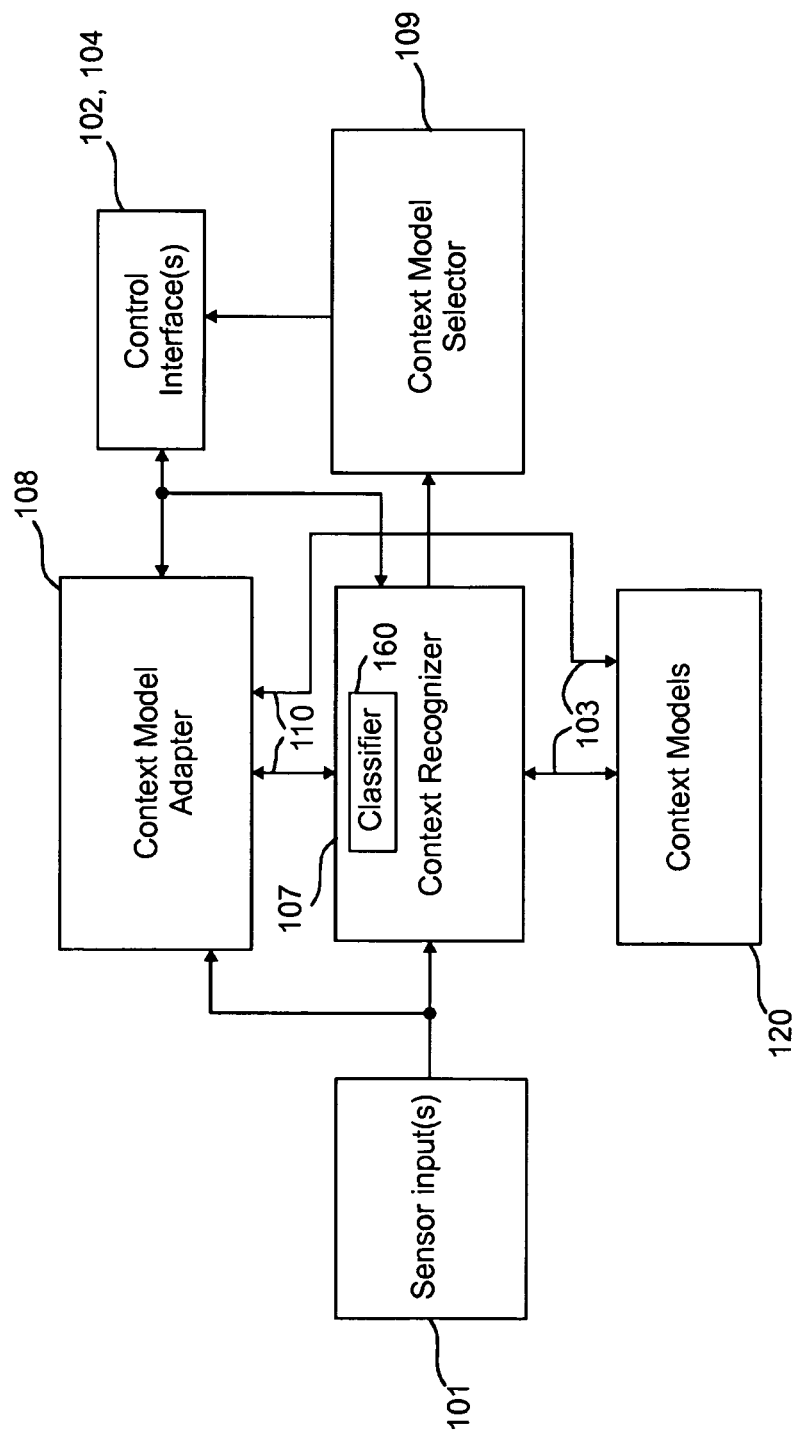
FIG. 4b shows schematically further details of a context recognizing and adapting module according to an embodiment of the invention.

In FIG. 4b some further details of an example embodiment of the context recognizing and adapting module 100 are depicted. It may comprise a context recognizer 107 which uses the context models 120 to perform the context recognition of a context on the basis of sensor data. Additionally, the context recognizer 107 may use additional application data, such as calendar data, provided through the application interface 102 to perform the context recognition of a context. The context recognizer 107 may also communicate with a context model adapter 108 via an interface 110 so that the context recognizer may indicate the context recognition results to the context model adapter 108. The context model adapter 108 may then use the same sensor data to adapt the context model which corresponds with the context recognition result and provide the adapted context model data to the memory where the context models 120 are stored via the context model interface 103. It should be noted here that although the context recognizer 107 and the context model adapter 108 are depicted as separate blocks they need not be separate elements but they can also be implemented as a unified circuitry and/or program code which contains functionalities for recognizing a context and for adapting the context.

In some embodiments the context recognizing and adapting module 100 may further comprise a context model selector 109 but it may also be part of the context recognizer 107. The context model selector 109 may use the recognition results to determine, which context model corresponds best with the analyzed sensor data. For example, the context model selector 109 may compare probabilities of the context models possibly defined by the context recognizer 107 and select that context model for which the probability is the greatest. Information of the selected context model may be provided to the application interface 102, to the search interface 104 or to another control interface.

The context recognizing and adapting module 100 can be implemented, for example, as a dedicated circuitry or as a program code of the controller 56 or a combination of these.

In some embodiments the apparatus 50 comprises one or more context models 120 stored, for example, in the memory 58. Different context models can exist for different contexts and for different kind of sensor data. It is also possible to have more than one context model for a context. For example, one or more representative samples may be used to describe each context. The context models may be e.g. in a form of algorithms, process steps, computer instructions, dedicated circuitry, parameter values of probability densities, parameter values of decision functions, feature values of one or more context prototypes or a combination of these. Context models are tools which can be used with input data e.g. from one or more sensors to determine the context in which the apparatus currently is located, or the context related to the current activity of the user. For example, the apparatus 50 may be carried by the user who is, for example, walking or running on a street, bicycling, travelling in a bus or a train, listening music in a concert hall, having a party with friends etc. This list represents only some non-limiting examples of possible contexts. It is also possible that more than one context applies to some situations. For example, the user can be bicycling on streets of a city.

In some embodiments the context models 120 may be stored in another device, for example, in a server 26.

The input data for context models 120 can come from one or more data sources 36, 110a-110e. For example, the input data can be audio data 110a represented by signals from e.g. a microphone 36, visual data represented by signals captured by one or more image sensors 110e, location data determined by e.g. a positioning equipment such as a receiver 110c of the global positioning system (GPS), data relating to the movements of the device and captured e.g. by an accelerometer 110b and/or a compass 110d, or the input data can be in another form of data. The input data of the context model may also be a combination of different kinds of sensor data. For example, the input data may contain an image and a sequence of audio data recorded when the image was captured. The recording of the audio data may have begun prior to the capturing of the image and ended after the image was captured. The context recognizing and adapting module 100 can then use the context models for image data and other context models for audio data to determine which context model suits best with the image data and which context model suits best with the audio data. The context recognizing and adapting module 100 may also evaluate probabilities for the analyzed context models so that the context model with the highest probability may be selected to represent the context.

It is also possible that recording of the audio or other sensor data may have begun prior to the capturing of the image and ended shortly before the image was captured, or the recording of the sensor data may have begun during the capturing of the image and ended after the image was captured. In other words, capturing of the sensor data is at least partly performed approximately when the image was captured i.e. in connection with the capturing of the image.

In the following an example of a method according to the present invention will be described in more detail. It is assumed that the method is implemented in the apparatus 50 but the invention may also be implemented in a combination of devices as will be described later in this application.

In this example it is assumed that the user of the apparatus 50 is browsing for her/his holiday photos on his apparatus 50. The holiday photos may be displayed on the display 32 one at a time or multiple pictures at a time. The user finds one image taken on a noisy street, tags it with the context tag "street", and wants to find other images the user remembers she/he has taken on other streets. The user then indicates to the apparatus 50 that this picture shall be used as a reference picture in a search of finding other pictures. The indication can be provided e.g. by touching the display at a location where the picture is shown, if the display 32 is the touch-sensitive display, or by moving a pointer (a cursor) on the picture and pressing a key on the keypad 34. Then, the user may select, for example, an option "find similar based on background sound". Information on the selected image is input to the image search module 108. In this example the information can be audio information stored to the memory 58 when the image was taken. Because the image was a street view it is probable that the audio information represents sounds of a street. The image search module 108 examines stored audio information of other pictures in the memory 58 and determines which pictures contain similar audio information than the picture the user has selected. For example, the result may be a set of pictures where the background sound ambiance sounds like a street according to the image search module 108. If one or more such pictures are found, the image search module 108 outputs this information to the application software logic 105 which may produce a list of the pictures found and provide that list on the display 32.

The user may then select one or more of the images which are what the user was looking for, e.g. from noisy streets, and tags them with the "street" tag. Information is sent to the context recognizing and adapting module 100 indicating that the audio features related to the tagged features should be associated with the tag "street". This is used by the context recognizing and adapting module 100 to adapt one or more context models to improve its accuracy by adapting the "street" context model with the corresponding features.

In another example, the user searches for images using a keyword-based search. Some of the images have been tagged automatically or with user assistance (e.g. as explained above in the previous example) with the context prevailing at the time of the image capture. For example, the user searches for images with a search query "street". The user gets a list of images matching the keyword-based search, some of which are returned because the tag indicating a context matches the search query. He selects one or more of the search results or otherwise indicates their relevance to the query. If the user selects an image where the tag indicating a context matches the search query, the relevant context model is adapted. For example, if the tag "street" was included in the image by an audio-based context model, information is sent to the context recognizing and adapting module 100 indicating that the audio-based context model for "street" should be adapted based on the audio features characteristic for the context of the selected image.

As a generalization of the examples, at least the following inter-related aspects can be utilized with this invention.

First, the context prevailing approximately at the time of the capture of a multimedia content item is derived using a context model. The prevailing context is presented to the user e.g. as suggested tags for the content item. The user provides relevance feedback which parts of the presented context, such as which keywords, are relevant and may also give feedback which ones are irrelevant or less relevant. The context model may then be adapted based on the relevance feedback.

Second, the user initiates a keyword based search. The keywords in the search query are compared to all keywords existing for the content items, both such that semantically describe the content and such that describe the context prevailing (or estimated to prevail) approximately at the time of the capture. The user may provide relevance feedback on the search results and the context model may be adapted based on the relevance feedback. If relevance feedback is provided for a content item included in the search results primarily because of the match of its context to the search query, the context model may be adapted more aggressively.

Third, the user initiates a similarity based search. In addition to searching based on the content or information characterizing the content of the example used as the search query, the context prevailing approximately at the time the example used as the search query was captured is used for searching. The user may provide relevance feedback on the search results, and the context model may be adapted based on the relevance feedback. If relevance feedback is provided for a content item included in the search results primarily because of the match of its context to the search query, the context model may be adapted more aggressively.

Figure 5:
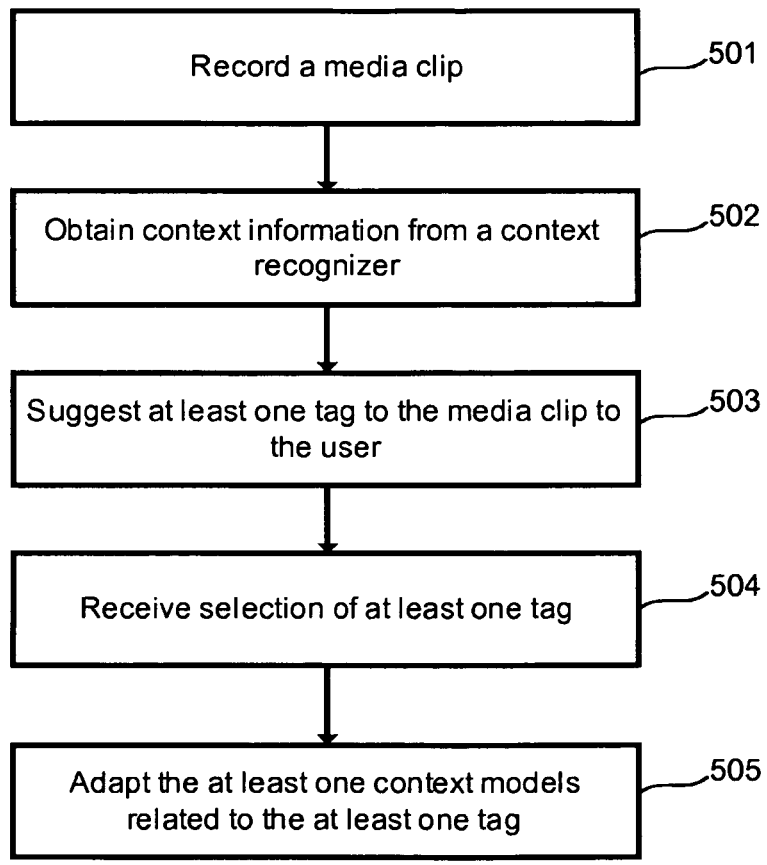
FIG. 5 shows an overview of processing steps to implement the invention.

FIG. 5 depicts some processing steps of a method according to an embodiment of the invention. The user captures 501*a* media clip, such as takes a photo, records an audio clip, or shoots a video. If a still image or a video is taken in step 501, an audio clip (e.g. 10 s for still images) may be recorded with the microphone. The audio recording may start e.g. when the user presses the shutter button 610 (FIG. 6*a*) to begin the auto-focus feature, and end after a predetermined time. Alternatively, the audio recording may take place continuously when the camera application is active and a predetermined window of time with respect to the shooting time of the image is selected to the short audio clip to be analyzed. The image may be stored and encoded as in conventional digital cameras.

Figure 6A:
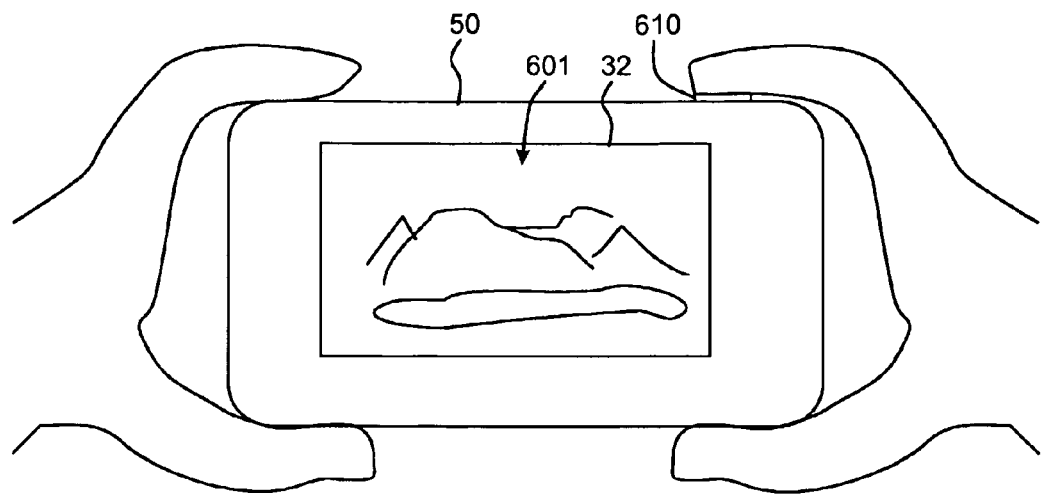
FIG. 6a depicts an example of a picture the user has taken.

Before, during, and/or after the capture, the apparatus 50 runs the context recognizer 107, which recognizes 502 the context around the device during or related to the media capture and/or the activity of the user before, during, and/or after the media capture. In one embodiment, the context recognizer 107 is an audio-based context recognizer which produces information on the surrounding audio ambiance. The audio-based context recognizer may e.g. produce tags like "street", "outdoors", "nature", "birds", "music", "people", "vehicles", "restaurant", "pub", and so on, each with an associated likelihood indicating how confident the context recognition is. In one embodiment, the activity context recognizer uses accelerometer, audio, and/or other sensors to determine the user's activity before media capture. The activity context recognizer may e.g. produce tags like "driving", "walking", and "cycling", each with an associated likelihood indicating how confident the context recognition is. An example of a captured image 601 is shown in FIG. 6*a*.

Figure 6B:
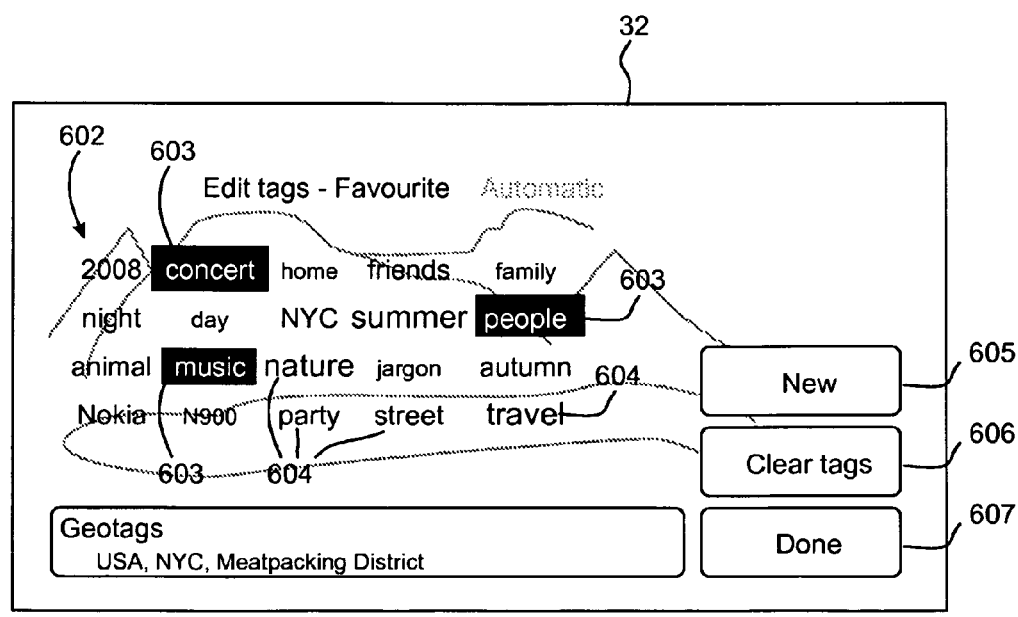
FIG. 6b depicts an example view of tags proposed by the apparatus, interleaving favorite tags and automatically derived tags.
Figure 6C:
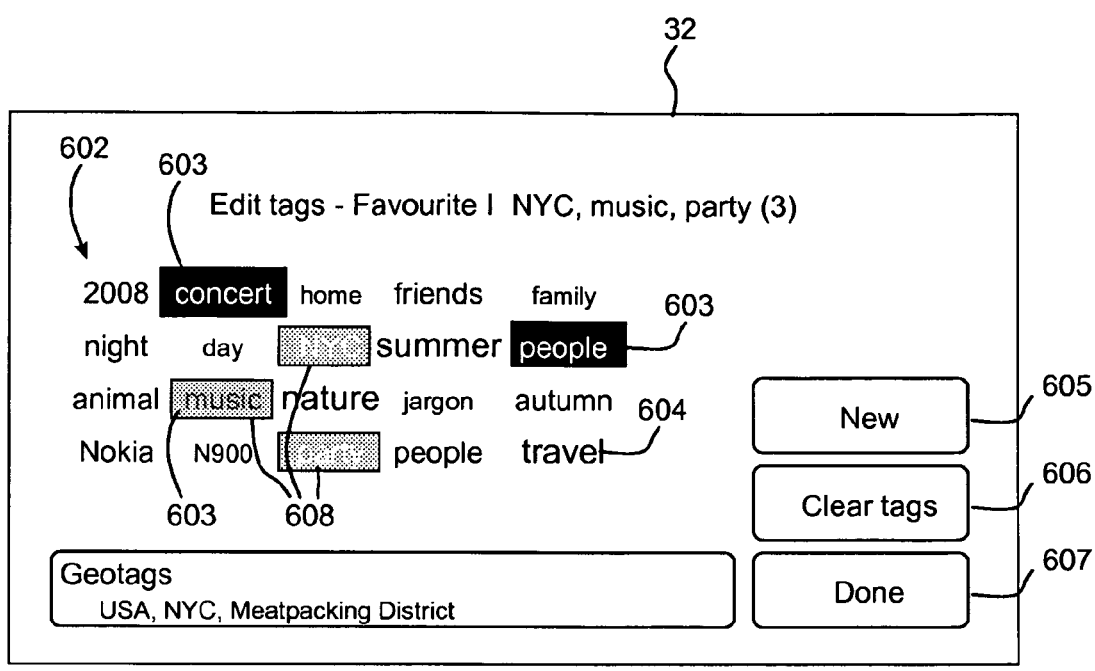
FIG. 6c depicts a selection of a combination of tags.

Information on the contextual tags obtained from the context recognizer 107 may then be provided to the application software logic 105 via the interface 102 so that an application, which shows the image on the display 32, can also form 503 a visible indication of the tag(s) obtained to be associated to the image. FIGS. 6*a* to 6*c* depict how the user interface 140 may look like. The tags may be shown on the display 32 of the user interface, e.g. as a tag cloud 602, as is illustrated in FIG. 6*b*. In one implementation, the system shows both previously used tags 604, and tags 603 obtained from the context recognizer 107. In one embodiment, the size of a tag may be adjusted according to the confidence of the tag. For example, tags with higher confidence may be presented with a larger tag compared to tags with lower confidence. In FIG. 6*b* the tags 603 suggested by the context recognizer 107 are depicted with white characters on a dark background and the other tags with dark characters on a white background but also other forms for presentation can be used in practical implementations.

The user then selects at least one tag to be associated to the image 601. The selection may be performed by touching the touch screen on the location where the tag is presented, or by the keypad 34. The user may select more than one tag. The user may also enter a new tag e.g. by touching the selection area 605 marked with the text New. The user may also clear the display 32 from tags by touching the selection area 606 marked with the text Clear tags.

When the user has selected all the tags he/she finds appropriate he/she can inform the end of the tag selection process e.g. by touching the selection area 606 marked with the text Done wherein the selected tags are associated with the image 601. Information on the selected tag(s) is also provided 504 to the context model adapter 108. If the selected tag was suggested by the context recognizer, the context model adapter 108 may then adapt 505 the corresponding context model. Alternatively or in addition, if the user inputs a tag that was not suggested by the context recognizer but exists in the context model, the context model adapter 108 may then adapt 505 the corresponding context model.

FIG. 6c depicts an example of a selection of tags by the user. The tags which are shown on a grey background and referred by the reference numeral 608 are such tags which the user of the apparatus 50 has selected. In this example, of the selected tags 608 the tag named as "music" is also a tag which was suggested by the context recognizer 107. Hence, the context model adapter 108 can determine that the context model relating to music may need adaptation. The context model adapter 108 can then examine which kind of sensory data is associated with the image 601. The context model adapter 108 retrieves the sensory data and uses it to adapt the context model for "music". The sensory data may be an audio clip or a sequence of audio feature vectors wherein the context model which is used for audible signals and associated with a music context shall be adapted, when necessary.

In another example, if the tag suggested and selected was "street", the context model adapter 108 adapts its model for "street". If there are different context models for different sensor data, the context model adapter 108 may adapt such a context model which corresponds with the sensor data. For example, if the sensor data was accelerometer data, the context model for accelerometer data is adapted.

When performing context recognition, the context recognizer may store in a memory buffer the sensory data, the sequence of features or feature vectors which were used to produce the recognition. When obtaining a request to adapt a model, the context adapter can use the sensory data, the sequence of features or feature vectors to adjust the corresponding context model to more closely represent the features. Examples of sensory data include audio data, represented e.g. as audio samples or using some encoding such as Adaptive Multi-Rate Wideband or MPEG-1 Audio Layer 3, image data (e.g. represented in Joint Photographic Experts Group JPEG format), accelerometer data (e.g. as values into three orthogonal directions x, y, z), location (e.g. as a tuple comprising latitude and longitude), ambient light sensor readings, gyroscope readings, proximity sensor readings, Bluetooth device identifiers, Wireless Local Area Network base station identifiers and signal strengths, cellular communication (such as 2G, 3G, 4G, Long Term Evolution) cellular tower identifiers and their signal strengths, and so on.

If the tag selected by the user was not suggested by the context recognizer 107, the context recognizer 107 may create a new model. This may be done in a manner similar to adaptation with the difference being that an initial default model may be used as a starting point, and adapted based on the stored feature data.

In addition to audio, the method is also applicable to other sensor data types. For example, the accelerometer sensor can be used to detect user activity, such as traveling in a car, running, walking, bicycling, and so on. For example, a context recognizer based on accelerometer data may recognize that the user is sitting in a train. When the user takes a picture in the train, the context recognizer 107 may suggest a tag "traveling by train". If the user selects the tag, the model for "train" may be adapted.

In a situation in which two or more different sources of sensor data are used in the analyses it may happen that one sensor data gives the highest probability to a different context model than another sensor data. For example, the use of audio data may result that the context recognizer 107 determines that the audio data represents a train context whereas the use of an accelerometer 110b as one sensor may result that the context recognizer 107 determines that the accelerometer data represents a running context. It is then possible that the context model 120 which has the highest probability is selected to represent the correct context. For example, the above mentioned audio data may indicate that the "train" context has the probability of 0.8 and the accelerometer data may indicate that the "running" context has the probability of 0.9 wherein the context recognizer 107 may then determine that the context to be selected is "running".

The context recognition and picture taking need not happen in the same device. Sensory data from sensors 110a-110e can be captured approximately at the time of picture taking and included in or provided with the picture. The picture and the sensory data may be transferred to another device, such as a server 26. The context recognition may be performed in the server 26. The server may provide the context recognition results to the device as suggested or probabilistic tags.

Figure 12:
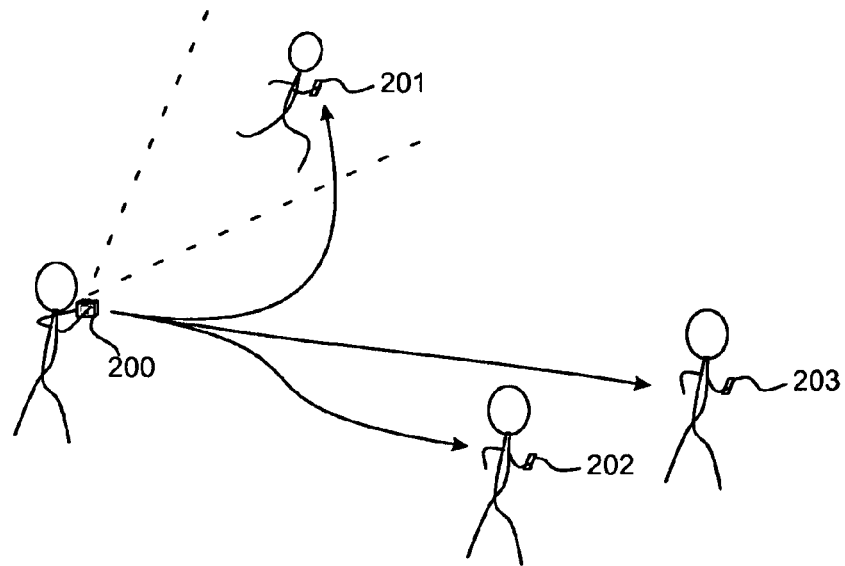
FIG. 12 shows an example of a use case of an example of a distributed picture capturing and context adaptation.

The context recognizer adaptation and picture taking do not need to happen in the same device. As an example the following use case is described with reference to FIG. 12. Jane takes by her device 200 a photo of a person having a mobile device 201 with him. Jane annotates the photo with "Bob running". Jane's device 200 shares annotated tags with nearby devices 201, 202, 203 by transmitting information on the tag to the nearby devices 201, 202, 203. The transmission may be performed by using some communication means. For example, a near field communication (NFC) or another short range communication technology can be used. In some embodiments it may be possible to transmit the information via a wireless local area network (WLAN), via internet or via mobile communication network.

In addition to the tag, the time of the media capture to which the tag is related may be shared. When Bob's device 201 receives information on the tag, the device 201 checks whether the tag is possibly related to the user of the device. Since it is tagged with "Bob", which is the name of the owner of the device 201, the device 201 determines that the tag is related to the device 201. Bob's device 201 then checks whether the context recognizer 107 was running during the media capture. If the context recognizer 107 was running, it analyzes the tag to determine whether the tag relates to a context attribute modeled by the context recognizer 107. In this case the tag has the text "running", so the context adapter 108 on Bob's device 201 may adapt the context model of related to "running".

When implementing the present invention in a system of multiple devices, it is possible to collect information relating to tags and sensor data from more than one device. These information can be send to e.g. a server 26 in which the analysis and possible context model adaptation can be performed.

The server 26 may have stored context relating data of one or more users. The data may have been attached with an identifier or other information indicating the user or the user's device from which the data has been received. Hence, the server 26 can determine which user's context model(s) need be adapted when new tag(s) and sensor data arrives.

Moreover, the analysis and context model adaptation need not be performed immediately after the data has been collected but it is possible to perform the analysis and context model adaptation at a later stage by using data relating to tags and sensor data stored e.g. into the memory 58 or to other storage unit.

Figure 7:
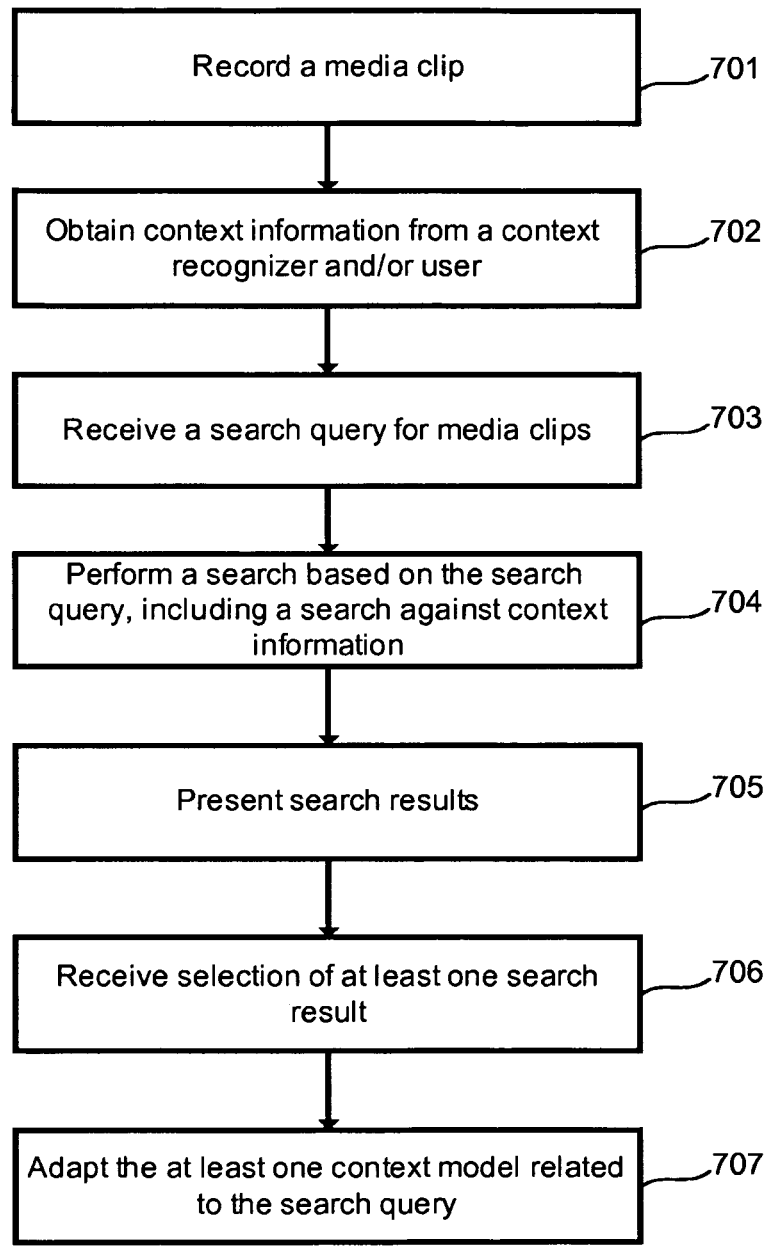
FIG. 7 shows an overview of processing steps of an embodiment based on search-based relevance feedback.

FIG. 7 depicts some processing steps related to the embodiment based on search-based relevance feedback. A first user first captures 701*a* media clip, such as takes a photo, records an audio clip, or shoots a video. Before, during, and/or after the capture, the device runs the context recognizer 107, which recognizes 702 the context around the device during or related to the media capture and/or the activity context of the user before, during, and/or after the capture. In one embodiment, the context recognizer 107 is an audio-based context recognizer which produces information on the surrounding audio ambiance. The audio-based context recognizer 107 may e.g. produce tags like "street", "outdoors", "nature", "birds", "music", "people", "vehicles", "restaurant", "pub", and so on, each with an associated likelihood indicating how confident the context recognition is. The output of the context recognizer may be presented to the user as suggested tags and the user may select suitable tags, as presented in the previous embodiment. The media clip and the selected tag(s) may be stored into a database 200 which may be in a separate device, for example in a server, or in the same device which captured the media clip. In the next step, a second user, who may but need not be the same as the first user, enters 703 a search query for searching of media clips. The search query may be keyword-based or example-based or a combination thereof. In case of an example based query, context information is extracted from the media clip used as an example. A search based on the search query is then performed 704. To perform the search the device of the second user communicates with the database which may be located in another device or in the same device which the second user is using. The search is at least partly done based on the context information: keywords, which may be interpreted to indicate context, context extracted from the media clip used as a seed for the search, or a combination thereof. Search results are then presented 705 to the second user, and the second user selects or indicates relevance of one or more of the search results. Information on the selection is received by the context model adapter 108. The context model adapter 108 adapts 707 the context model related to the search query based on those search results for which the selection or relevance feedback is received. If the second user selects such a media clip from the search results that is included as a search result based on the context information, then the context model may be adapted more aggressively.

The search results may contain one or more photos, videos or other kind of media clip. The search results may be shown, for example, by displaying the photo(s) as such and displaying a representative image(s) of the video(s).

In some embodiments the device 50 senses the environment the device is operating, such as outdoors, indoors, office, or restaurant, and activity, such as running or walking, so that the device and/or applications and services running in the device may adapt to the user's situation. For example, if the user is walking, running or bicycling on a street, the device may increase the volume of the loudspeaker and the ringing tone so that the user may better hear when there is an incoming call. Respectively, when the user is e.g. in a theatre, in museum, in a concert hall or in another place where a mobile phone should be silent, the device 50 may switch to a silent mode.

In some embodiments the context of the apparatus 50 may be transmitted to one or more other devices, for example to devices of some friends of the user, to one or more services such as facebook, twitter, linkedin etc.

In the following some examples of types of context information and context recognition are discussed in more detail.

Activity Context

The context recognizer 107 may analyze a pattern of movement defined by an accelerometer signal to determine activity context information describing an activity in which a user of the client apparatus is engaged. This activity may, for example, comprise walking, jogging, running, bicycling, skateboarding, skiing, and/or the like. In one example, the analyzing the accelerometer signal comprises one or more operations of preprocessing the accelerometer signal to reduce noise; taking the magnitude of a three-axis accelerometer signal to ignore the mobile device orientation, calculating features from the accelerometer signal; and inputting the features into a classifier 160 to determine the activity. Feature extraction may, for example, comprise windowing the accelerometer signal, taking a Discrete Fourier Transform (DFT) of the windowed signal, and extracting features from the DFT. In one example, the features extracted from the DFT include for example one or more spectrum power values, power spectrum centroid, or frequency-domain entropy. In addition to features based on the DFT, the context recognizer may extract features from the time-domain accelerometer signal. These time-domain features may include, for example, mean, standard deviation, zero crossing rate, 75% percentile range, interquartile range, and/or the like. Using the features, the classifier 160 used by the context recognizer may be trained to classify between the activities. In this regard, the context recognizer 107 may be configured to implement and/or utilize one or more classifiers, including, for example decision trees, support vector machines, naïve Bayes, k-Nearest Neighbor, and/or the like.

As another example, the context recognizer 107 may be configured to perform activity context recognition based on fluctuation of signal strength to one or more cellular service towers (e.g., one or more GSM, LTE, LTE-Advanced, 3G, and/or the like base transceiver stations). Additionally or alternatively, the context recognizer 107 may be configured to perform activity recognition based at least in part on a speed obtained from a GPS receiver 110*c*. As another example, the context recognizer 107 may perform activity context recognition based on a fusion of sensory information captured from multiple sensors 110*a*-110*e*.

Audio Context

Audio context information may describe general characteristics of the captured audio, such as energy, loudness, or spectrum. Audio context information may also describe the type of environment where the audio was captured. Example audio environments may be 'office', 'car', 'restaurant' etc. Audio context information may also identify one or more audio events describing audible sounds present in the location at which the audio was captured. Such audio events may comprise, for example, human noise, conversation, vehicle noise, animal noise, construction noise, running water, and/or the like. Audio events may comprise continuous noises or sounds that last for the whole duration of the captured audio or events that have a specific start and end time in the captured audio (e.g., last for a partial duration of the captured audio). One or more audio events may be extracted from a certain input audio clip. It is also possible that no audio events are extracted from an input audio clip, for example if a confidence value is too low. Furthermore, the same event may also occur in the input audio clip multiple times.

The context recognizer 107 may be configured to determine audio context information by any applicable method for audio analysis. In one example, the context recognizer 107 may be configured to identify audio events contained within captured audio using at least one model, such as, for example, a Gaussian mixture model (GMM), hidden Markov model (HMM), and/or the like. In one example, identifying audio events and determining audio context information comprises extracting a set of features from the audio signal, calculating a likelihood of a model of each audio event having generated the features, and selecting the audio event corresponding to the model resulting in the largest likelihood. An off-line training stage may be performed to obtain these models for each of a subset of audio events. In the off-line training stage, the same features may be extracted from a number of examples of each of a subset of sound events, and a model may be trained for each sound event class using the respective features. Various other methods can also be used, including classification using support vector machines, decision trees, hierarchical or non-hierarchical classifiers, and/or the like. Furthermore, in one example the identification may comprise comparing the likelihood of each audio event against at least one predetermined threshold, and identifying an audio event only if the at least one predetermined threshold is exceeded. Various features may be applied to this purpose, including, but not limited to, mel-frequency cepstral coefficients (MFCC), features described in the Moving Pictures Expert Group (MPEG) 7 standard such as Audio Spectrum Flatness, Spectral Crest Factor, Audio Spectrum Envelope, Audio Spectrum Centroid, Audio Spectrum Spread, Harmonic Spectral Centroid, Harmonic Spectral Deviation, Harmonic Spectral Spread, Harmonic Spectral Variation, Audio Spectrum Basis, Audio Spectrum Projection, Audio Harmonicity or Audio Fundamental Frequency, spectral power or energy values, linear prediction coefficients (LPC), any transformation of the LPC coefficients such as reflection coefficients or line spectral frequencies, zero-crossing rate, crest factor, temporal centroid, onset duration, envelope amplitude modulation, and/or the like.

The features may be indicative of the audio bandwidth. The features may comprise spectral roll-off features indicative of the skewness of the spectral shape of the audio signal. The features may be indicative of the change of the spectrum of the audio signal such as the spectral flux. The features may also comprise any combination of any of the features described herein and/or similar features not explicitly described herein. The features may also comprise a transformed set of features obtained by applying a transformation such as Principal Component Analysis, Linear Discriminant Analysis or Independent Component Analysis, Non Negative Matrix Factorization, or Linear Discriminant Analysis to any combination of features to obtain a transformed set of features with lower dimensionality and desirable statistical properties such as uncorrelatedness or statistical independence. The features may comprise the feature values measured in adjacent frames. To elaborate, the features may comprise, for example, a K+1 by T matrix of spectral energies, where K+1 is the number of spectral bands and T the number of analysis frames of the audio clip. The features may also comprise any statistics of the features, such as the mean value and standard deviation calculated over all the frames. The features may additionally comprise statistics calculated in segments of arbitrary length over the audio clip, such as mean and variance of the feature vector values in adjacent one-second segments of the audio clip. The features may further comprise dynamic features calculated as derivatives of different order over time of one or more features. In one embodiment, the extraction of the features comprises windowing the audio signal, taking a short-time discrete Fourier transform at each window, and extracting at least one feature based on the transform. In one embodiment, the event identification comprises detecting onsets from the audio signal, extracting features from a portion of the audio signal following each detected onset, and recognizing audio events corresponding to each onset.

In one embodiment, the identifying audio events and determining audio context information comprises calculating distances to a predetermined number of example sound events or audio contexts. In this embodiment, models are not trained for audio context but each audio context or sound event may be represented with a certain number of representative examples. When analyzing the captured audio, the context recognizer may subject the captured audio to feature analysis. The context recognizer may follow the feature analysis by performing distance calculation(s) between the features extracted from the captured audio and the stored example features. The context recognizer may determine dominant sound events or audio context for a certain location based on the dominant sound event or audio context within a predetermined number of nearest neighbors of the captured audio.

In one embodiment, the system uses a mel-frequency cepstral coefficient front-end which outputs 13 cepstral coefficients and their 1st and 2nd order derivatives. The MFCCs are calculated from 16 kHz audio data using a window of 480 samples or 30 ms per frame and a frame shift of 40 ms.

In one embodiment, the system records a 3-second audio clip and extracts a sequence of MFCC feature vectors. The sequence of feature vectors is then passed to the classification stage e.g. to the classifier 160 which evaluates the probability of a set of context models having generated the features, and selects the context as the one corresponding to the model giving the largest likelihood. The system also stores the 3-second buffer of MFCC feature vectors to be used for possible adaptation or creation of a new class.

The acoustic models used in some example embodiments are quantized Gaussian Mixture models (qGMMs). Quantized hidden Markov models are created starting from Gaussian Mixture models by applying a scalar quantization on the mean and variance parameters. Two quantizers are built, one for the mean parameters and one for the variance parameters. Quantizing the model parameters, if certain conditions hold, allows for faster probability calculation during recognition compared to continuous density models.

The probability calculation using continuous models may be done using the following formula:

$$\log b(x) = \log \sum_{k=1}^{K} \exp\left\{ \log\left( w_k \frac{1}{\prod_{i=1}^{N} \sqrt{2\pi\sigma_{ki}^2}} \right) - \sum_{i=1}^{N} \frac{(x_i - \mu_{ki})^2}{2\sigma_{ki}^2} \right\} \quad (1)$$

where K is the number of densities in the Gaussian mixture, $\mu_{ki}$ and $\sigma_{ki}$ are the mean and standard deviation of the ith feature vector component of the kth density, respectively, and N is the feature vector dimension. For each density, there are two parts, a constant and the Mahalanobis distance to the feature vector x. When the mean and standard deviation are quantized, there exists, for a single feature value, a discrete set of values the Mahalanobis distance can take.

Once a feature vector has been obtained, the Mahalanobis distance can be pre-computed for the quantized mean and variance pairs for each feature and stored as a table in the memory 58, for example. The probabilities for the densities may then be calculated by finding the appropriate values from the table for each feature and summing them up.

In the classification stage, the context is determined as the one corresponding to the model giving the largest probability.

According to an example embodiment the models may be trained by first using maximum-likelihood (ML) training to create a Gaussian Mixture model for each context. The number of Gaussians per Gaussian Mixture model is increased during training by running a few iterations of the maximum-likelihood training and then splitting the Gaussians with the largest variance and repeating this a few times. After the maximum-likelihood training the model parameters are quantized by applying e.g. a Lloyd-Max quantizer on the mean and variance parameters separately. In some embodiments 5 bit quantization (32 quantization levels) is used for the mean parameters and 3 bits (8 quantization levels) for the variance parameters. These values were chosen due to the fact that they perform well and a mean and variance value pair can be stored in a single 8-bit byte. Also, 5 bit feature quantization may be used. The same quantizer that is used for the means is also used for the feature quantizer.

Social Context

As another example, the context recognizer may be configured to extract social context information describing the number and/or other characteristics of people surrounding a client apparatus. For example, the context recognizer may be configured to derive an estimated number of people in the general vicinity of the client apparatus. This estimate may be made, for example, based on a number of electronic devices detected within a proximate range of the client apparatus, such as through Bluetooth transmissions. As a further example, the context recognizer may collect other characteristics such as gender, nationality, occupation, hobbies, social background, or other characteristics of nearby people. The characteristics may be obtained, for example, by communicating with the devices of the nearby people or communicating with a centralized database storing user profile information. As a further example, social context information may also be derived using other sensors of a client apparatus, such as a microphone, camera, and/or the like. For example, the context recognizer might analyze the captured audio to determine the gender of nearby people, or analyze captured images to assist in determining or to determine the number of people.

In general, the invention is not limited to any particular type of context information or context model.

In the following some methods for performing the adaptation of a context model will be described in more detail.

In one embodiment, the apparatus 50 receives adaptation data in the form of a sequence of MFCC feature vectors and a label (or labels) specifying the environment the adaptation data was recorded in. The adaptation data and the label is passed to the context model adapter 108. The context model adapter 108 then modifies (adapts) the model parameters corresponding to the label to better fit the adaptation data.

The adaptation can be performed using, for example, maximum a posteriori (MAP) adaptation. MAP adaptation is performed by first creating a network of the models corresponding to the label(s). The network is essentially a hidden Markov model (HMM) with the environment GMMs of the labels in parallel. Then, using the forward-backward or the Viterbi algorithm, the occupation probabilities of the Gaussian mixture components of the network are calculated for the adaptation data. These probabilities are then used to obtain the adapted parameter values.

MAP adaptation for the mean parameter of mixture component m of state j is done using, for example, the following formula:

$$\hat{\mu}_{jm} = \frac{N_{jm}}{N_{jm}+\tau}\bar{\mu}_{jm} + \frac{\tau}{N_{jm}+\tau}\mu_{jm} \quad (2)$$

where $\mu_{jm}$ is the unadapted mean, $\tau$ is an adaptation weight and $N_{jm}$ is the occupation likelihood of the adaptation data and $\bar{\mu}_{jm}$ is the observed mean of the adaptation data:

$$N_{jm} = \sum_{t=1}^{T} L_{jm} \quad (3)$$

$$\bar{\mu}_{jm} = \frac{\sum_{t=1}^{T} L_{jm}(t) o_t}{\sum_{t=1}^{T} L_{jm}(t)} \quad (4)$$

where $L_{jm}(t)$ is the occupation probability for mixture component m of model j at time t, $o_t$ is the tth feature vector and T is the length of the sequence of feature vectors. $L_{jm}(t)$ can be calculated using the forward-backward or the Viterbi algorithm.

The above formulas describe MAP adaptation for continuous density GMMs. They apply to quantized GMMs as well, with the exception that after adaptation, the parameters need to be quantized again.

In addition to MAP adaptation, other adaptation methods may be used to adapt the models. For example, maximum likelihood linear regression (MLLR) adaptation or maximum a posteriori linear regression (MAPLR) adaptation could be used.

In such embodiments, where the context is represented with one or more characteristic examples, the adaptation may be done using various heuristics. For example, if each context is represented by a number of feature vectors extracted from sensory data extracted from the particular context, adaptation may be done by adding the feature vectors extracted from the adaptation sensory data to the training data of this particular context.

The present invention can be implemented, for example, in one apparatus 50 or in a plurality of apparatuses. The context recognizer 107 may be implemented in the same apparatus 50 than the context adapter 108 or they may be located in different apparatuses. It is also possible that the context recognizer 107 receives sensor data from sensors of the same apparatus 50 and/or from sensors from other apparatuses. In the latter case the sensor data from other apparatuses may be communicated to the apparatus 50 by any suitable communication means.

In one embodiment the context recognizer 107 is implemented in the user's apparatus 50 and the context adapter 108 is implemented in the server 26 (FIG. 3) with which the user' apparatus 50 may communicate to transmit information on recognized context and information on the tag(s) the user has selected to the server 26 in which the context adapter 108 can adapt context models on the basis of the context recognition result(s) and selection of the tag(s). It may also be necessary to transmit to the server 26 the sensory data which the context recognizer 107 used in the recognition.

In another embodiment both the context recognizer 107 and the context adapter 108 are implemented in the server 26. The user's apparatus 50 transmits sensor data and information on the selection of the tag(s) to the server 26 in which the context recognition and the context model adaptation may then be performed.

Figure 8:
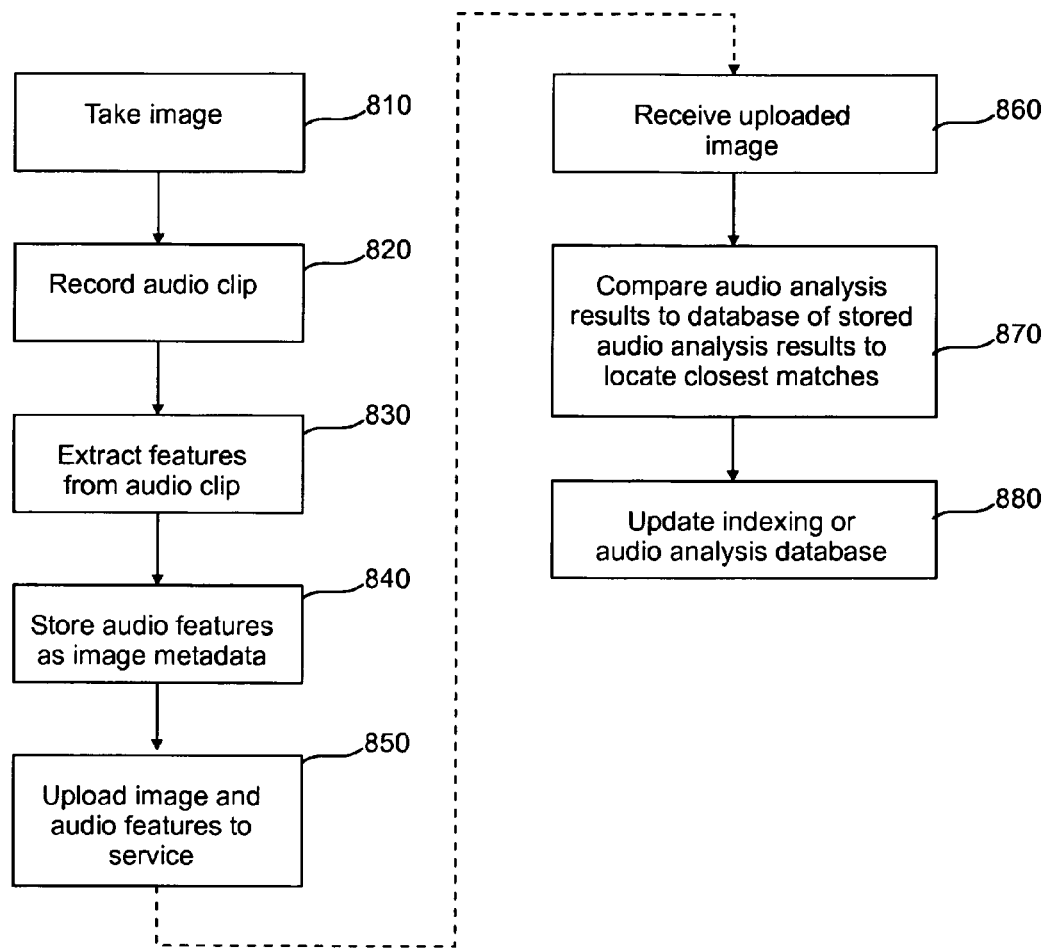
FIG. 8 shows a method for carrying out a search from image data by applying a search criterion on audio features.

FIG. 8 presents a method according to an embodiment for image searching in an end-to-end content sharing solution such as Ovi Share or Image Space. The figure depicts the operation flow when an image is taken with the mobile device and uploaded to the service. The user may take 810 a picture or a piece of video e.g. with the mobile phone camera. Alternatively, the picture may be taken with a standalone camera and uploaded to a computer. Yet alternatively, the standalone camera may have processing power enough for analysing images and sounds and/or the standalone camera may be connected to the mobile network or internet directly. Yet alternatively, the picture may be taken with a camera module that has processing power and network connectivity to transmit the image or image raw data to another device. In step 820, a short audio clip may be recorded; and in step 830 features may be extracted from the audio clip. The features can be e.g. mel-frequency cepstral coefficients (MFCCs). In step 840, the extracted audio features may be stored along with the image as metadata or associated with the image data in some other way like using a hyperlink. In step 850, the image along with audio features may next be uploaded to a content sharing service such as Nokia Ovi. The following steps may be done at the server side.

When the server receives the image along with audio features in step 860, it may perform further processing to the audio features. The further processing in step 870 may mean, for example, computing the mean, covariance, and inverse covariance matrix of the MFCC features as described later to be used as a model for the probability distribution of the feature vector values of the audio clip. The further analysis may also include estimating the parameters of a Gaussian Mixture Model or a Hidden Markov Model to be used as a more sophisticated model of the distribution of the feature vector values of the audio clip. The further analysis may also include running a classifier 160 such as an audio-based context recognizer, speaker recognizer, speech/music discriminator, or other analyzer to produce further meaningful information from the audio clip. The further analysis may also be done in several steps, for example such that first a speech/music discriminator is used to categorize the audio clip to portions containing speech and music. After this, the speech segments may be subjected to speech specific further analysis such as speech and speaker recognition, and music segments to music specific further analysis such as music tempo estimation, music key estimation, chord estimation, structure analysis, music transcription, musical instrument recognition, genre classification, or mood classification. The benefit of running the analyzer at the server may be that it reduces the computational load and battery consumption at the mobile device. Moreover, much more computationally intensive analysis methods may be performed than is possible in the mobile device. When the further analysis has been performed to the received features, the analysis results may be stored to a database.

To perform the search in step 870, the audio features may be compared to analysis results of previously received audio recordings. This may comprise, for example, computing a distance between the audio analysis results of the received audio clip and all or some of the audio clips already in the database. The distance may be measured, for example, with the symmetrised Kullback-Leibler divergence between the Gaussian fitted on the MFCC features of the new audio clip and the Gaussians fitted to other audio clips in the database. The Kullback-Leibler divergence measure will be described in more detail later. After the search in step 880, indexing information can be updated at the server. This is done in order to speed up queries for similar content in the future. Updating the indexing information may include, for example, storing a certain number of closest audio clips for the new audio clip. Alternatively, the server may compute and maintain clusters of similar audio clips in the server, such that each received audio clips may belong to one or more clusters. Each cluster may be represented with one or more representative audio clip features. In this case, distances from the newly received audio clip may be computed to the cluster centers and the audio clip may be assigned to the cluster corresponding to the closest cluster center distance.

Responding to online content queries may happen as described in the right hand side of FIG. 8. When queries for similar images are made, the similarity results may be adapted based on distances between the audio clips in the service. The results can be returned fast based on the indexing information. For example, if the image used as search query is already in the database, based on the indexing information the system may return a certain number of closest matches just with a single database query. If clustering information is maintained at the server, the server may first compute a distance from the audio clip of the query image to the cluster centers, and then compute distances within that cluster, avoiding the need to compute distances to all the audio clips in the system. The final query results may be determined, for example, based on a summation of a distance measure based on image similarity and audio clip similarity. In addition, other sensory information such as distance between GPS location coordinates may be combined to obtain the final ranking of query results.

Figure 9:
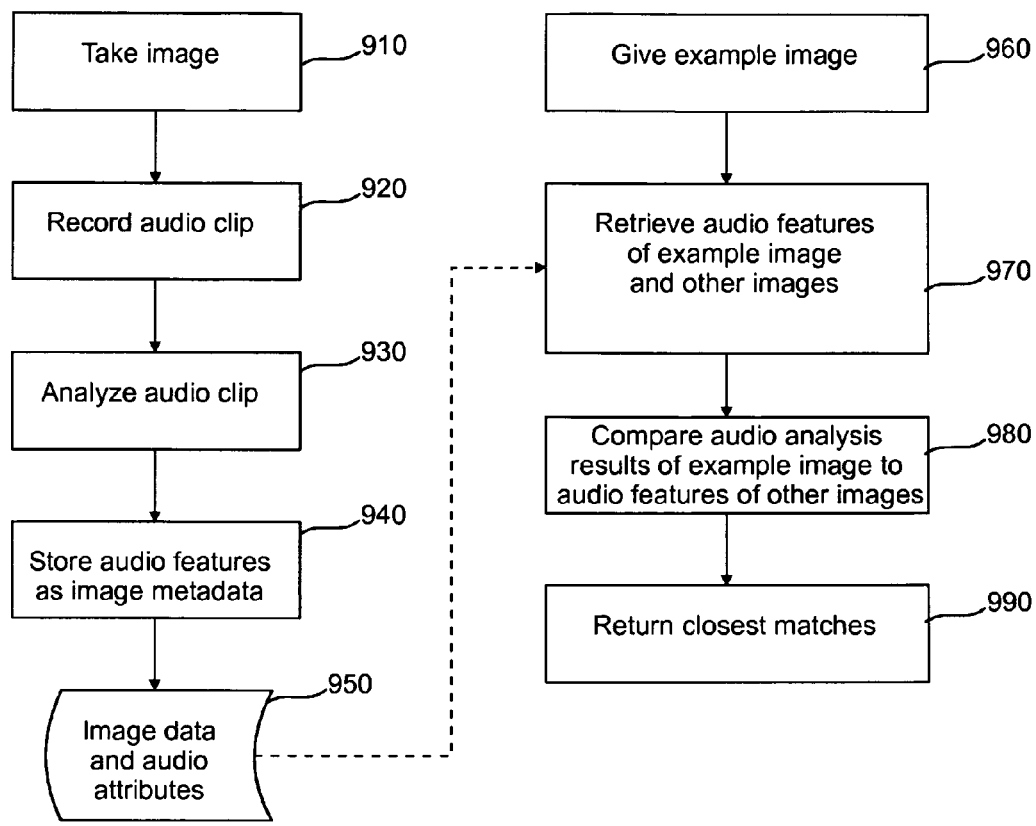
FIG. 9 shows a method for carrying out a search from image data by comparing audio features associated with images.

An example of a method for carrying out a search from image data by comparing audio features associated with images is shown in FIG. 9. The method may be implemented e.g. on a mobile terminal with a camera and audio recording capability. When a still image or a video is taken in step 910, an audio clip (e.g. 10 s for still images) may be recorded with the microphone in step 920.

In step 930, the audio sample may be processed to extract audio attributes. The analysis may comprise extracting audio features such as mel-frequency cepstral coefficients (MFCC). Other audio features, such as MPEG-7 audio features, can be used as well. The audio attributes obtained based on the analysis may be stored as image metadata or associated with the image some other way in step 940. The metadata may reside in the same file as the image. Alternatively, the metadata may reside in a separate file from the image file and just be logically linked to the image file. That logical linking can exist also in a server into which both metadata and image file have been uploaded. Several variants exist on what information attributes may be stored. The audio attributes may be audio features, such as MFCC coefficients. The attributes may be descriptors or statistics derived from the audio features, such as mean, covariance, and inverse covariance matrices of the MFCCs. The attributes may be recognition results obtained from an audio-based context recognition system, a speech recognition system, a speech/music discriminator, speaker gender or age recognizer, or other audio object analysis system. The attributes may be associated with a weight or probability indicating how certain the recognition is. The attributes may be spectral energies at different frequency bands, and the center frequencies of the frequency bands may be evenly or logarithmically distributed. The attributes may be short-term energy measures of the audio signal. The attributes may be linear prediction coefficients (LPC) used in audio coding or parameters of a parametric audio codec or parameters of any other speech or audio codec. The attributes may be any transformation of the LPC coefficients such as reflection coefficients or line spectral frequencies. The LPC analysis may also be done on a warped frequency scale instead of the more conventional linear frequency scale. The attributes may be Perceptual Linear Prediction (PLP) coefficients. The attributes may be MPEG-7 Audio Spectrum Flatness, Spectral Crest Factor, Audio Spectrum Envelope, Audio Spectrum Centroid, Audio Spectrum Spread, Harmonic Spectral Centroid, Harmonic Spectral Deviation, Harmonic Spectral Spread, Harmonic Spectral Variation, Audio Spectrum Basis, Audio Spectrum Projection, Audio Harmonicity or Audio Fundamental Frequency or any combination of them. The attributes may be zero-crossing rate indicators of some kind. The attributes may be the crest factor, temporal centroid, or envelope amplitude modulation. The attributes may be indicative of the audio bandwidth. The attributes may be spectral roll-off features indicative of the skewness of the spectral shape of the audio signal. The attributes may be indicative of the change of the spectrum of the audio signal such as the spectral flux. The attributes may be a spectral centroid according to the formula $$SC_t = \frac{\sum_{k=0}^{K} k|X_t(k)|}{\sum_{k=0}^{K} |X_t(k)|} \quad (5)$$

where $X_t(k)$ is the kth frequency sample of the discrete Fourier transform of the tth frame and K is the index of the highest frequency sample.

The attributes may also be any combination of any of the features or some other features not mentioned here. The attributes may also be a transformed set of features obtained by applying a transformation such as Principal Component Analysis, Linear Discriminant Analysis or Independent Component Analysis to any combination of features to obtain a transformed set of features with lower dimensionality and desirable statistical properties such as uncorrelatedness or statistical independence.

The attributes may be the feature values measured in adjacent frames. To elaborate, the attributes may be e.g. a K+1 by T matrix of spectral energies, where K+1 is the number of spectral bands and T the number of analysis frames of the audio clip. The attributes may also be any statistics of the features, such as the mean value and standard deviation calculated over all the frames. The attributes may also be statistics calculated in segments of arbitrary length over the audio clip, such as mean and variance of the feature vector values in adjacent one-second segments of the audio clip.

It is noted that the analysis of the audio clip need not be done instantaneously after shooting the picture and the audio clip. Instead, the analysis of the audio clip may be done in a non-real-time fashion and can be postponed until sufficient computing resources are available or the device is being charged.

In one embodiment, resulting attributes 950 are uploaded into a dedicated content sharing service. Attributes could also be saved as tag-words. In one embodiment, a single audio clip represents several images, usually taken temporally and/or spatially close to each other. The features of the single audio clip are analyzed and associated to these several images. The features may reside in a separate file and be logically linked to the image files, or a copy of the features may be included in each of the image files.

When a user wishes to make a query in the system, he may select one of the images as an example image to the system in step 960 or give search criteria as input in some other way. The system may then retrieve the audio attributes from the example image and other images in step 970. The audio attributes of the example image are then compared to the audio attributes of the other images in the system in step 980. The images with the closest audio attributes to the example image receive higher ranking in the search results and are returned in step 990.

Figure 10:
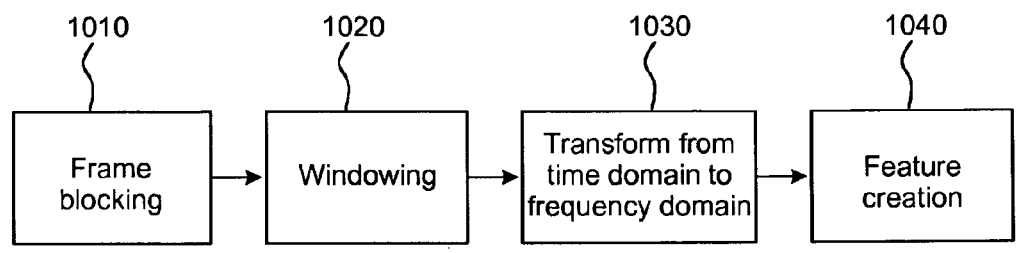
FIG. 10 shows a diagram of the formation of audio features by applying a transform from time-domain to frequency domain.

FIG. 10 shows the forming of audio features or audio attributes where at least one transform from time domain to frequency domain may be applied to the audio signal. In step 1010, frames are extracted from the signal by way of frame blocking. The blocks extracted may comprise e.g. 256 or 512 samples of audio, and the subsequent blocks may be overlapping or they may be adjacent to each other according to hop-size of for example 50% and 0%, respectively. The blocks may also be non-adjacent so that only part of the audio signal is formed into features. The blocks may be e.g. 30 ms long, 50 ms long, 100 ms long or shorter or longer. In step 1020, a windowing function such as the Hamming window or the Hann window is applied to the blocks to improve the behaviour of the subsequent transform. In step 1030, a transform such as the Fast Fourier Transform (FFT) or Discrete Cosine Transform (DCT), or a Wavelet Transform (WT) may be applied to the windowed blocks to obtain transformed blocks. Before the transform, the blocks may be extended by zero-padding. The transformed blocks now show e.g. the frequency domain characteristics of the blocks. In step 1040, the features may be created by aggregating or downsampling the transformed information from step 1030. The purpose of the last step may be to create robust and reasonable-length features of the audio signal. To elaborate, the purpose of the last step may be to represent the audio signal with a reduced set of features that well characterizes the signal properties. A further requirement of the last step may be to obtain such a set of features that has certain desired statistical properties such as uncorrelatedness or statistical independence.

FIG. 11 shows the creation of mel-frequency cepstral coefficients (MFCCs). The input audio signal 1105, e.g. in pulse code modulated form, is fed to the pre-emphasis block 1110. The pre-emphasis block 1110 may be applied if it is expected that in most cases the audio contains speech and the further analysis is likely to comprise speech or speaker recognition, or if the further analysis is likely to comprise the computation of Linear Prediction coefficients. If it is expected that the audio in most cases is e.g. ambient sounds or music it may be preferred to omit the pre-emphasis step. The frame blocking 1120 and windowing 1125 operate in a similar manner as explained above for steps 1010 and 1020. In step 1130, a Fast Fourier Transform is applied to the windowed signal. In step 1135, the FFT magnitude is squared to obtain the power spectrum of the signal. The squaring may also be omitted, and the magnitude spectrum used instead of the power spectrum in the further calculations. This spectrum can then be scaled by sampling the individual dense frequency bins into larger bins each spanning a wider frequency range. This may be done e.g. by computing a spectral energy at each mel-frequency filterbank channel by summing the power spectrum bins belonging to that channel weighted by the mel-scale frequency response. The produced mel-filterbank energies may be denoted by $\tilde{m}_j$, j=1, ..., N, where N is the number of bandpass mel-filters. The frequency ranges created in step 1140 may be according to a so-called mel-frequency scaling shown by 1145, which resembles the properties of the human auditory system which has better frequency resolution at lower frequencies and lower frequency resolution at higher frequencies. The mel-frequency scaling may be done by setting the channel center frequencies equidistantly on the mel-frequency scale, given by the formula $$Mel(f) = 2595 \log_{10}\left(1 + \frac{f}{700}\right) \quad (6)$$

where f is the frequency in Hertz.

Figure 11A:
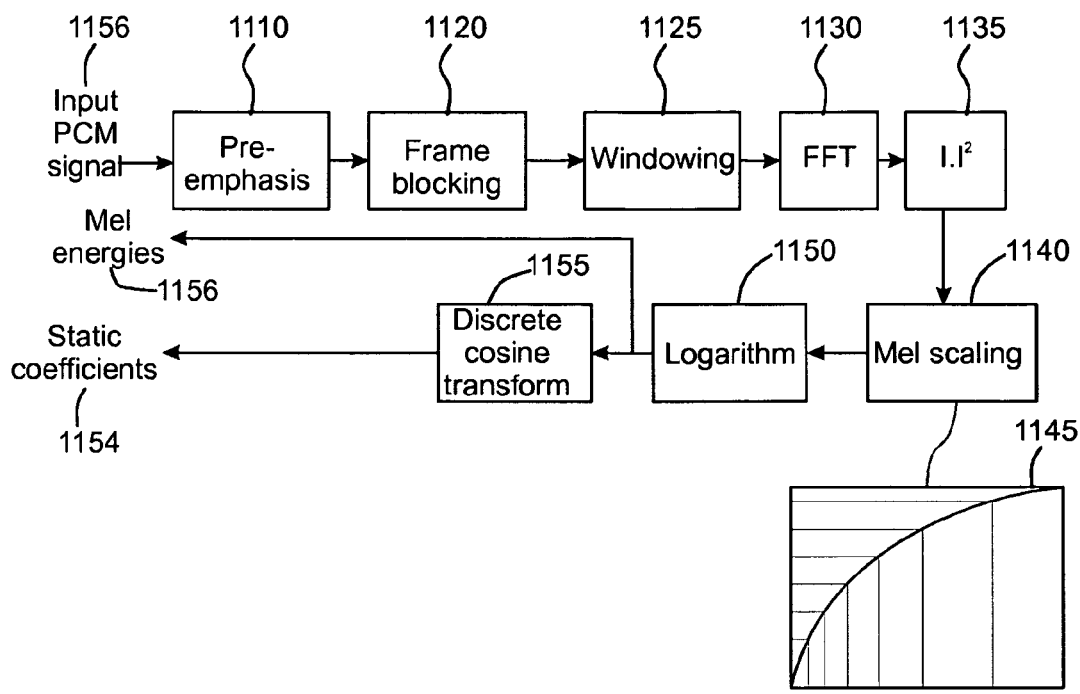
FIG. 11a shows a diagram of the formation of mel-frequency cepstral coefficients as audio features.
Figure 11B:
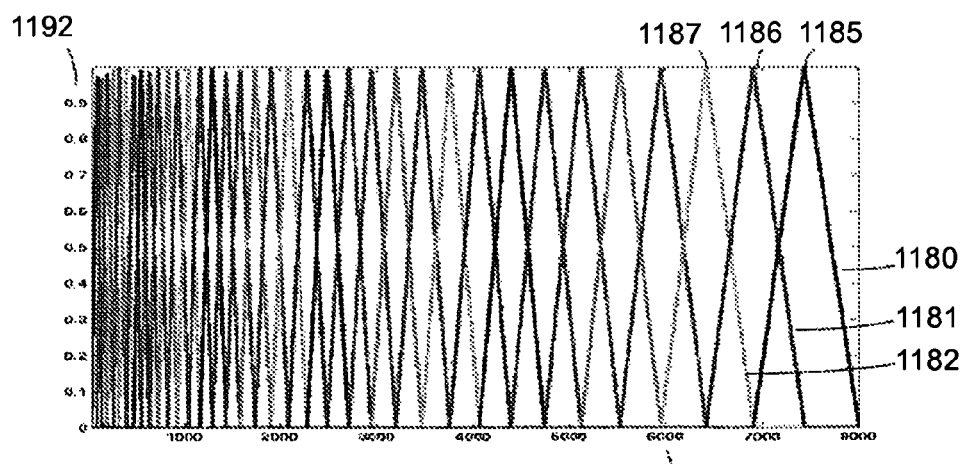
FIG. 11b shows a possible formation of a filter bank for the creation of mel-frequency cepstral coefficients or other audio features.

An example mel-scale filterbank is given in FIG. 11*b*. In FIG. 11*b*, 36 triangular-shaped bandpass filters are depicted whose center frequencies 1185, 1186, 1187 and others not numbered may be evenly spaced on the perceptually motivated mel-frequency scale. The filters 1180, 1181, 1182 and others not numbered may span the frequencies 1190 from 30 hz to 8000 Hz. For the sake of example, the filter heights 1192 have been scaled to unity. Variations may be made in the mel-filterbank, such as spanning the band center frequencies linearly below 1000 Hz, scaling the filters such that they will have unit area instead of unity height, varying the number of mel-frequency bands, or changing the range of frequencies the mel-filters span.

In FIG. 11*a* in step 1150, a logarithm, e.g. a logarithm of base 10, may be taken from the mel-scaled filterbank energies $\tilde{m}_j$ producing the log filterbank energies $m_j$, and then a Discrete Cosine Transform 1155 may be applied to the vector of log filterbank energies $m_j$ to obtain the MFCCs 1154 according to $$c_{mel}(i) \sum_{j=1}^{N} m_j \cos\left(\frac{\pi \cdot i}{N}\left(j - \frac{1}{2}\right)\right) \quad (7)$$

where N is the number of mel-scale bandpass filters. i=0, ..., I and I is the number of cepstral coefficients. In an exemplary embodiment, I=13. It is also possible to obtain the mel energies 1156 from the output of the logarithm function. As a result, the audio features may be for example 13 mel-frequency cepstral coefficients per audio frame, 13 differentiated MFCCs per audio frame, 13 second degree differentiated MFCCs per audio frame, and an energy of the frame.

In one embodiment, different analysis is applied to different temporal segments of the recorded audio clip. For example, audio recorded before and during shooting of the picture may be used for analyzing the background audio ambiance, and audio recorded after shooting the picture used for recognizing keyword tags uttered by the user. In another embodiment, there may be two or more audio recordings: one done when the picture is taken and another later on in a more convenient time. For example, the user might add additional tags by speaking when browsing the images for the first time.

In one embodiment of the invention, the search results may be ranked according to audio similarity, so that images with the most similar audio attributes are returned first.

In some embodiments of the invention, the similarity obtained based on the audio analysis is combined with a second analysis based on image content. For example, the images may be analyzed e.g. for colour histograms and a weighted sum of the similarities/distances of the audio attributes and image features may be calculated. For example, such combined audio and image comparison may be applied in steps 880 and 980. For example, a combined distance may be calculated as $$D(s,i) = w_1 \cdot (d(s,i) - m_1)/s_1 + w_2 \cdot (d_2(s,i) - m_2)/s_2, \quad (8)$$

where $w_1$ is a weight between 0 and 1 for the scaled distance d(s,i) between audio features, and $m_1$ and $s_1$ are the mean and standard deviation of the distance d. The scaled distance d between audio features is described in more detail below. $d_2(s,i)$ is the distance between the image features of images s and i, such as the Euclidean distance between their color histograms, and $m_2$ and $s_2$ are the mean and standard deviation of the distance, and $w_2$ its weight. To compute the mean and standard deviation, a database of image features may be collected and the various distances d(s,i) and $d_2(s,i)$ computed between the images in the database. The means $m_1$, $m_2$ and standard deviations $s_1$, $s_2$ may then be estimated from the distance values between the items in the database. The weights may be set to adjust the desired contribution of the different distances. For example, the weight $w_1$ for the audio feature distance d may be increased and the weight $w_2$ for the image features lowered if it is desired that the audio distance weighs more in the combined distance.

In some embodiments of the invention, the similarity obtained based on the audio analysis may be combined with other pieces of similarity obtained from image metadata, such as the same or similar textual tags, similar time of year and time of day and location of shooting a picture, and similar camera settings such as exposure time and focus details, as well as potentially a second analysis based on image content.

In one embodiment of the invention, a generic audio similarity/distance measure may be used to find images with similar audio background. The distance calculation between audio clips may be done e.g. with the symmetrised Kullback-Leibler (KL) divergence, which takes as parameters the mean, covariance, and inverse covariance of the MFCCs of the audio clips. The symmetrised KL divergence may be expressed as $$KLS(s,i) = \frac{1}{2}[Tr(\Sigma_i^{-1}\Sigma_s + \Sigma_s^{-1}\Sigma_i) - 2d + (\mu_s - \mu_i)^T(\Sigma_i^{-1} + \Sigma_s^{-1})(\mu_s - \mu_i)] \quad (9)$$

where Tr denotes the trace and where the mean, covariance and inverse covariance of the MFCCs of the example image are denoted by $\mu_s$, $\Sigma_s$, and $\Sigma_s^{-1}$, respectively, the parameters for the other image are denoted with the subscript i, and d by 1 is the dimension of the feature vector. The mean vectors are also of dimension d by 1, and the covariance matrices and their inverses have dimensionality d by d. The symmetrized KL divergence may be scaled to improve its behavior when combining with other information, such as distances based on image color histograms or distances based on other audio features. The scaled distance d(s, i) may be computed as $$d(s,i)=-\exp(-\gamma \cdot KLS(s,i)),$$

where γ is a factor controlling the properties of the scaling and may be experimentally determined. The value may be e.g. γ=1/450 but other values may be used as well. The similarity/distance measure may also be based on Euclidean distance, correlation distance, cosine angle, Bhattacharyya distance, the Bayesian information criterion, or on L1 distance (taxi driver's distance), and the features may be time-aligned for comparison or they may not be time-aligned for comparison. The similarity measure may be a Mahalanobis distance taking into account feature covariance.

The benefit of storing audio features for the image may be that the audio samples do not need to be stored, which saves memory. When a compact set of audio related features is stored, the comparison may be made with images with any audio on the background using a generic distance between the audio features.

In another embodiment a speech recognizer 152 is applied on the audio clip to extract tags uttered by the user to be associated to the image. The tags may be spoken one at a time, with a short pause in between them. The speech recognizer 152 may then recognize spoken tags from the audio clip, which has been converted into a feature representation (MFCCs for example). The clip may be first segmented segments containing a single tag each using a Voice Activity Detector (VAD). Then, for each segment, speech recognition may be performed such that a single tag is assumed as output. The recognition may be done based on a vocabulary of tags and acoustic models (such as Hidden Markov Models) for each of the tags, as follows:
  1) First, an acoustic model for each tag in the vocabulary may be built.
  2) Then, for each segment, the acoustic likelihood of each of the models producing the feature representation of the current tag segment may be calculated.
  3) The tag, whose model gave the best likelihood, may be chosen as the recognition output.
  4) Repeat 2) and 3) until all segments have been recognized The recognition may be performed on the same audio clip as is used for audio similarity measurement, or a separate clip recorded by the user at a later, and perhaps more convenient time. The recognition may be done entirely on the phone or such that the audio clip or the feature representation is sent to a server backend which performs the recognition and then sends the recognized tags back to the phone. Recognition results may also be uploaded into a multimedia content sharing service.

In another embodiment of the invention, moving sound objects (e.g. number of objects, speed, direction) may be analyzed from the audio.

In another embodiment of the invention, the direction of the audio objects may be used to affect the weights associated with the tags and/or to create different tag types. For example, if the directional audio information indicates that the sound producing object is in the same direction where the camera points at (determined by the compass 110d) it may be likely that the object is visible in the image as well. Thus, the likelihood of the object/tag is increased. If the sound producing object is located in some other direction, it may likely be not included in the image but is tagged as a background sound.

In another embodiment, different tag types may be added for objects in the imaged direction and objects in other direction. For example, there might be tags
<car><background><0.3>
<car><foreground><0.4>
indicating that a car is recognized in the foreground with probability 0.4 and in the background with probability 0.3. These two types of information may be included in the image searches, e.g. for facilitating searching images of cars, or images with car sounds in the background.

In addition, the parameterization of the audio scene captured with more than one microphone may reveal the number of audio sources in the image or in the area the picture was taken outside the direction camera was pointing.

The captured audio may be analyzed with binaural cue coding (BCC) parameterization determining the inter channel level and time differences at sub-band domain. The multi channel signal may be first analyzed e.g. with short term Fourier transform (STFT) splitting the signal into time-frequency slots. Now, analyzing the level and time differences in each time-frequency slot as follows:

$$\Delta L_n = 10\log_{10}\left(\frac{S_n^L * S_n^L}{S_n^R * S_n^R}\right)$$

$$\varphi_n = \angle(S_n^L * S_n^R)$$

where $S_n^L$ and $S_n^R$ are the spectral coefficient vectors of left and right (binaural) signal for sub-band n of the given analysis frame, respectively, and * denotes complex conjugate. There may be 10 or 20 or 30 sub-bands or more or less. Operation ∠ corresponds to a tan 2 function determining the phase difference between two complex values. The phase difference may naturally correspond to the time difference between left and right channels.

The level and time differences may be mapped to a direction of arrival of the corresponding audio source using panning laws. When the level and time difference are close to zero, the sound source at that frequency band may be located directly in between the microphones. If the level difference is positive and it appears that the right signal is delayed compared to the left, the equations above may indicate that the signal is most likely coming from the left side. The higher the absolute value of the level and time difference is, the further away from the center the sound source may be.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The invention may also be provided as an internet service wherein the apparatus may send a media clip, information on the selected tags and sensor data to the service in which the context model adaptation may take place. The internet service may also provide the context recognizer operations wherein the media clip and the sensor data is transmitted to the service, the service send one or more proposals of the context which are shown by the apparatus to the user, and the user may then select one or more tags. Information on the selection is transmitted to the service which may then determine which context model may need adaptation, and if such need exists, the service may adapt the context model.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method in an apparatus comprising:
 receiving a media clip;
 receiving sensor data captured at least partly in connection with a capture of the media clip;
 deriving at least one context using a context model based at least partly on the sensor data;
 causing an indication on the context to be provided to a user by receiving a search query having at least one search criterion that is relevant to the context, deriving a similarity between the context and the at least one search criterion and causing at least a part of the media clip to be presented with an indication on the context based on the derived similarity as a response to the search query;
 receiving feedback on the relevance of the indication on the context of the presented media clip to the search query from the user; and
 adapting the context model based on the feedback.

2. The method according to claim 1 additionally comprising deriving a first parameter value indicating a probability of the sensor data matching the context.

3. The method according to claim 2 comprising deriving a similarity between the context and the at least one context-related search criterion, wherein adapting the context model is additionally based on the similarity and the method additionally comprises adapting the first parameter value based on at least one of the feedback or the similarity.

4. The method according to claim 1 additionally comprising using the context model independently of the reception of the media clip for determining at least one of an activity context, an audio context, and a social context.

5. The method according to claim 1, wherein said causing an indication on the context to be provided to the user comprises:
 associating a set of keywords with the context; and
 presenting the set of keywords to the user.

6. The method according to claim 5, wherein said receiving feedback comprises receiving a selection of a keyword from the set of keywords by the user.

7. The method according to claim 1, wherein said receiving feedback comprises receiving feedback on relevance of the media clip relative to the at least one context-related search criterion.

8. The method according to claim 1, wherein the search query comprises an example including or accompanying a first context-related data item, and wherein deriving a similarity comprises deriving a similarity between the context and the first context-related data item.

9. The method according to claim 8, wherein said receiving feedback comprises receiving feedback on relevance of the media clip relative to the first context-related data item.

10. An apparatus comprising:
 at least one processor; and
 and at least one memory including computer program code,
 the at least one memory and the computer program code configured to, with the at least one processor, cause the apparatus at least to
 receive a media clip;
 receive sensor data captured at least partly in connection with a capture of the media clip;
 derive at least one context using a context model based at least partly on the sensor data;
 cause an indication on the context to be provided to a user by receiving a search query having at least one search criterion that is relevant to the context, deriving a similarity between the context and the at least one search criterion and causing at least a part of the media clip to be presented with an indication on the context based on the derived similarity as a response to the search query;

receive feedback on the relevance of the indication on the context of the presented media clip to the search query from the user; and adapt the context model based on the feedback.

11. The apparatus according to claim 10, wherein the at least one memory and the computer program code are further configured to, with the at least one processor, cause the apparatus at least to derive a first parameter value indicating a probability of the sensor data matching the context.

12. The apparatus according to claim 10, wherein the at least one memory and the computer program code are further configured to, with the at least one processor, cause the apparatus at least to use the context model independently of the reception of the media clip for determining at least one of an activity context, an audio context, and a social context.

13. The apparatus according to claim 10, wherein the at least one memory and the computer program code are further configured to, with the at least one processor, cause the apparatus at least to:

associate a set of keywords with the context; and present the set of keywords to the user.

14. The apparatus according to claim 13, wherein the at least one memory and the computer program code are further configured to, with the at least one processor, cause the apparatus at least to receive a selection of a keyword from the set of keywords by the user.

15. The apparatus according to claim 10, wherein the at least one memory and the computer program code are further configured to, with the at least one processor, cause the apparatus at least to receive feedback on relevance of the media clip relative to the at least one context-related search criterion.

16. The apparatus according to claim 10, wherein the at least one memory and the computer program code are further configured to, with the at least one processor, cause the apparatus at least to:

adapt the context model additionally based on the similarity; and adapt the first parameter value based on at least one of the feedback or the similarity.

17. The apparatus according to claim 10, wherein the search query comprises an example including or accompanying a first context-related data item, and wherein deriving a similarity comprises deriving a similarity between the context and the first context-related data item.

18. A computer program product comprising at least one computer-readable storage medium having computer-executable program code portions stored therein, the computer-executable program code portions comprising program code instructions for:

receiving a media clip;

receiving sensor data captured at least partly in connection with a capture of the media clip;

deriving at least one context using a context model based at least partly on the sensor data;

causing an indication on the context to be provided to a user by receiving a search query having at least one search criterion that is relevant to the context, deriving a similarity between the context and the at least one search criterion and causing at least a part of the media clip to be presented with an indication on the context based on the derived similarity as a response to the search query;

receiving feedback on the relevance of the indication on the context of the presented media clip to the search query from the user; and adapting the context model based on the feedback.

* * * * *